(12) United States Patent
Takahashi et al.

(10) Patent No.: US 6,353,713 B1
(45) Date of Patent: Mar. 5, 2002

(54) CAMERA HAVING A DATA IMPRINTING DEVICE

(75) Inventors: Hiroyuki Takahashi, Tochigi; Mikio Ogi, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/414,065

(22) Filed: Oct. 7, 1999

(30) Foreign Application Priority Data

Oct. 7, 1998 (JP) .......................................... 10-285346

(51) Int. Cl.⁷ ............................................... G03B 17/24
(52) U.S. Cl. ....................................... 396/315; 396/318
(58) Field of Search ................................... 396/310, 311, 396/315, 316, 317, 318

(56) References Cited

U.S. PATENT DOCUMENTS

| 4,825,233 A | * | 4/1989 | Kanai et al. | ............... | 396/317 |
| 5,432,571 A | * | 7/1995 | Aoki et al. | ............... | 396/315 |

FOREIGN PATENT DOCUMENTS

| GB | 2222267 | 2/1990 |
| JP | 60-95520 | 5/1985 |
| JP | 62-96935 | 5/1987 |
| JP | 63-21634 | 1/1988 |
| JP | 7-140542 | 6/1995 |

OTHER PUBLICATIONS

English Language Abstract of JP 63–21634.
English Language Abstract of JP 62–96935.
English Language Abstract of JP 60–95520.

* cited by examiner

*Primary Examiner*—David M. Gray
(74) *Attorney, Agent, or Firm*—Greenblum & Bernstein, P.L.C.

(57) ABSTRACT

A camera having a data imprinting function, includes a data imprinting device for imprinting data on film, the data imprinting device including a light emitter which emits light to the film from the film base surf ace side of the film in accordance with character information; a film-type identifying device for identifying the sensitivity of the film; and a controller for determining a quantity of light emitted by the light emitter in accordance with the sensitivity of the film identified by the film-type identifying device, and for adjusting the quantity of light in accordance with the sensitivity of the film.

23 Claims, 21 Drawing Sheets

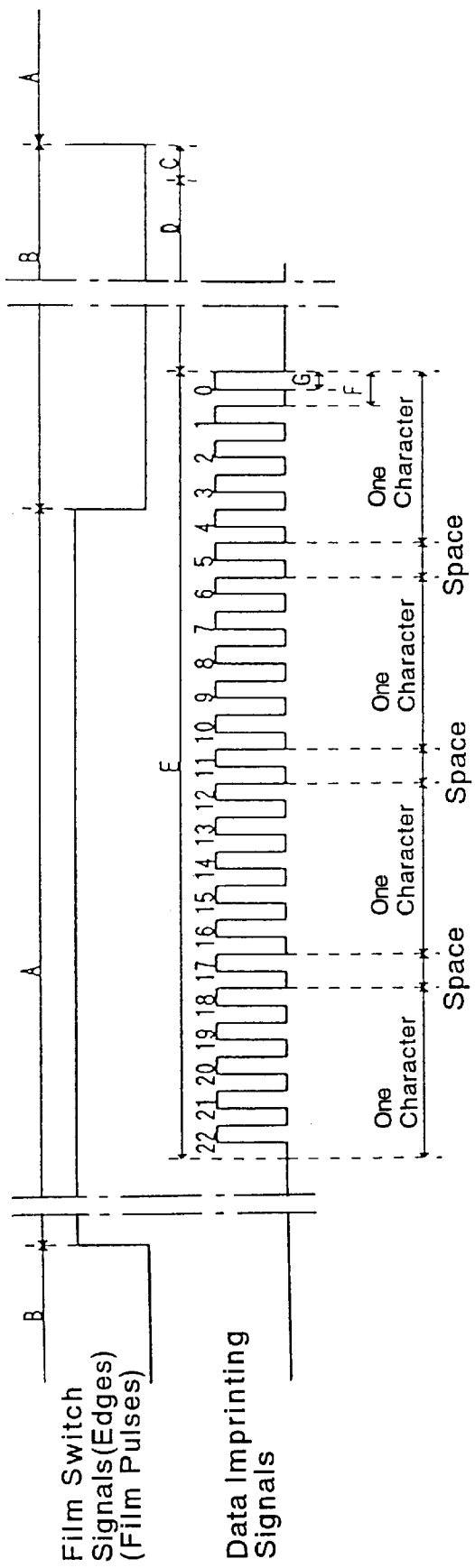

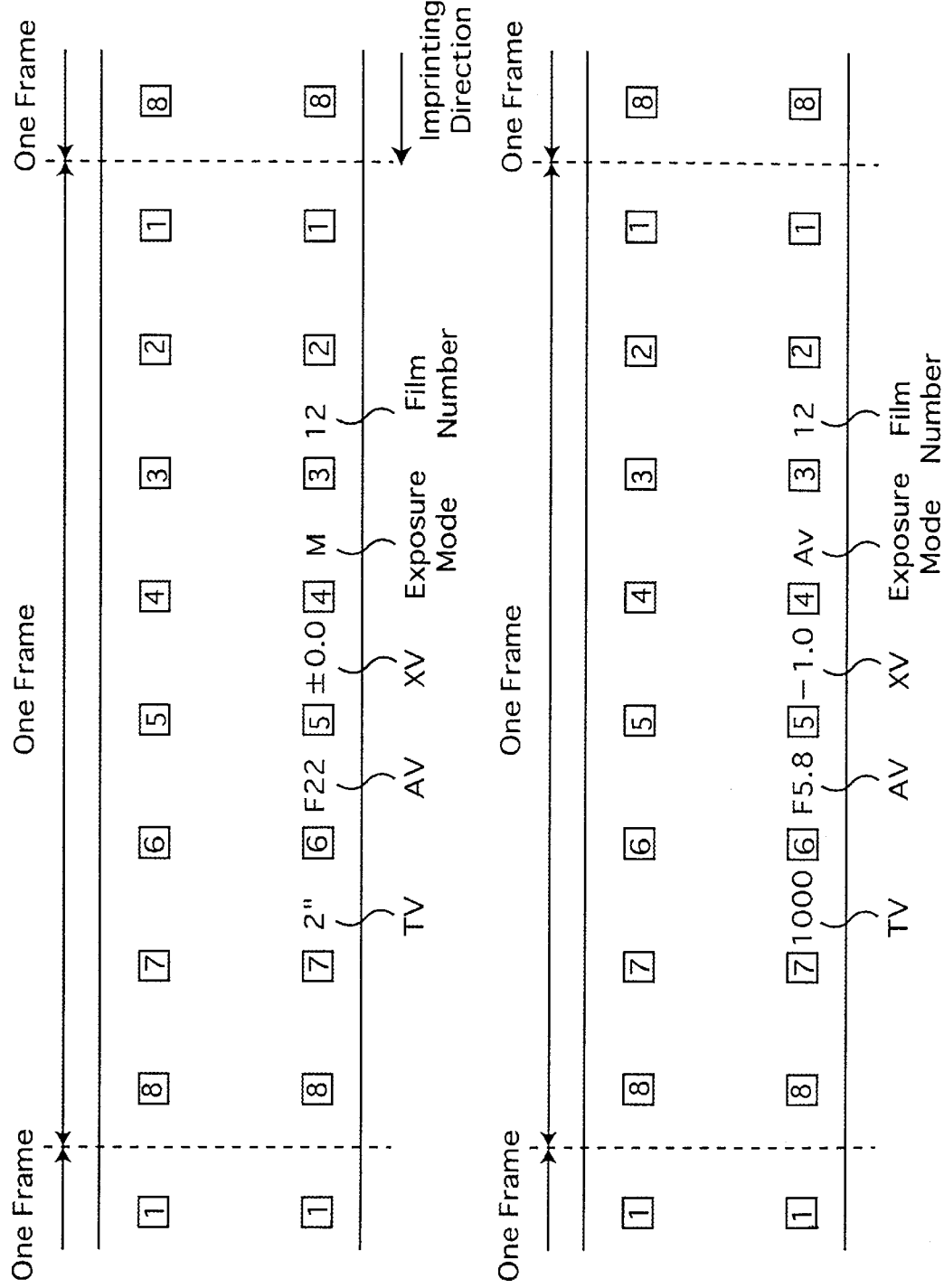

CAMERA HAVING A DATA IMPRINTING DEVICE

BACKGROUND OF THE INVENTION

1. Field of the Invention

The present invention relates to a camera provided with a data imprinting device for imprinting photographic data such as a date, time, shutter speed, aperture value, etc., on film.

2. Description of the Related Art

A camera provided with a data imprinting device for imprinting photographic data such as a date, time, shutter speed, aperture value, etc., on film at the time of winding or rewinding the film is known. In such a camera, in order to improve the quality of character patterns imprinted on film, a method of changing the density of imprinting characters of photographic data by adjusting the quantity of light emitted to imprint character patterns, in accordance with ISO speed information of film loaded in the camera is known. Such a method is disclosed in Japanese Laid-Open Patent Publication No. 7-140542. According to this method, in the case of using slow film (e.g. a reversal film) which generally has a film base of a low transmittance, the quantity of light determined in accordance with ISO speed information is not sufficient to imprint characters of photographic data having an appropriate density, especially when the photographic data is imprinted on film from the side of the film base surface, not from the side of sensitive surface. Therefore, in the case of using slow film, photographic data having an appropriate density cannot be imprinted on the film.

SUMMARY OF THE INVENTION

The primary object of the present invention is to provide a camera having a data imprinting device for imprinting photographic data on film in predetermined areas thereof from the film base surface side, wherein photographic data of a high quality can be imprinted on film at all times regardless of sensitivity of film or film type.

To achieve the object mentioned above, according to an aspect of the present invention, there is provided a camera having a data imprinting function, including: a data imprinting device for imprinting data on film, the data imprinting device including a light emitter which emits light to the film from the film base surface side of the film in accordance with character information; a film-type identifying device for identifying the sensitivity of the film; and a controller for determining a quantity of light emitted by the light emitter in accordance with the sensitivity of the .film identified by the film-type identifying device, and for adjusting the quantity of light in accordance with the sensitivity of the film.

Preferably, the film-type identifying device determines whether the film is reversal film, wherein the controller increasing the quantity of light if the film-type identifying device determines that the film is the reversal film.

According to another aspect of the present invention, there is provided a camera having a data imprinting function, including: a data imprinting device for imprinting data on film, the data imprinting device including a light emitter which emits light to the film from the film base surface side of the film in accordance with character information; a film-type identifying device for identifying the sensitivity of the film and for determining whether the film is reversal film; and a controller for determining a quantity of light emitted by the light emitter in accordance with the sensitivity of the film identified by the film-type identifying device, and for increasing the quantity of light if the film-type identifying device determines that the film is the reversal film.

Preferably, the controller controls the quantity of light emitted by the light emitter by varying the duration of a light emission of the light emitter.

Preferably, the controller controls the quantity of light emitted by the light emitter by varying the power of a light emission of the light emitter.

Preferably, the controller increases the determined quantity of light by extending the duration if the film-type identifying device determines that the film is the reversal film.

Preferably, there is further provided a latitude identifying device for detecting the latitude of the film; wherein the film-type identifying device determines whether the film is the reversal film in accordance with the latitude detected by the latitude identifying device.

Preferably, the film is accommodated in a film cassette including a DX code, and wherein the latitude identifying device detects the latitude by reading latitude data from the DX code.

Preferably, the film-type identifying device identifies the sensitivity by reading sensitivity data from the DX code.

Preferably, the data, imprinted by data imprinting device, includes at least one of Time Value, Aperture Value, Exposure Compensation Value, Exposure Mode and Frame Number.

Preferably, the data imprinting device imprints the data on the film between two adjacent sprocket holes thereof.

According to another aspect of the present invention there is provided a camera including: a data imprinting device having a light emitter which emits light to film from the film base surface side of the film in accordance with character information; a film-type identifying device for determining whether the film is a reversal film; and a controller for controlling the light emitter to emit a first quantity of light in accordance with the sensitivity identified by the film-type identifying device if the film-type identifying device determines that the film is a type of film other than the reversal film, and for controlling the light emitter to emit a second quantity of light in accordance with the sensitivity identified by the film-type identifying device if the film-type identifying device determines that the film is the reversal film, the second quantity of light being greater than the first quantity of light.

Preferably, the controller controls a quantity of light emitted by the light emitter by varying a duration of a light emission of the light emitter.

The present disclosure relates to subject matter contained in Japanese Patent Application No. 10-285346 (filed on Oct. 7, 1998) which is expressly incorporated herein by reference in its entirety.

BRIEF DESCRIPTION OF THE DRAWINGS

The present invention will be described below in detail with reference to the accompanying drawings in which:

FIG. 17 is an enlarged view of part of the time chart shown in FIG. 16A; and

FIGS. 18A and 18B are plan views of part of a roll film on which photographic data is imprinted by the data imprinting device of the camera to which the present invention is applied.

DESCRIPTION OF THE PREFERRED EMBODIMENT

Figure 1:
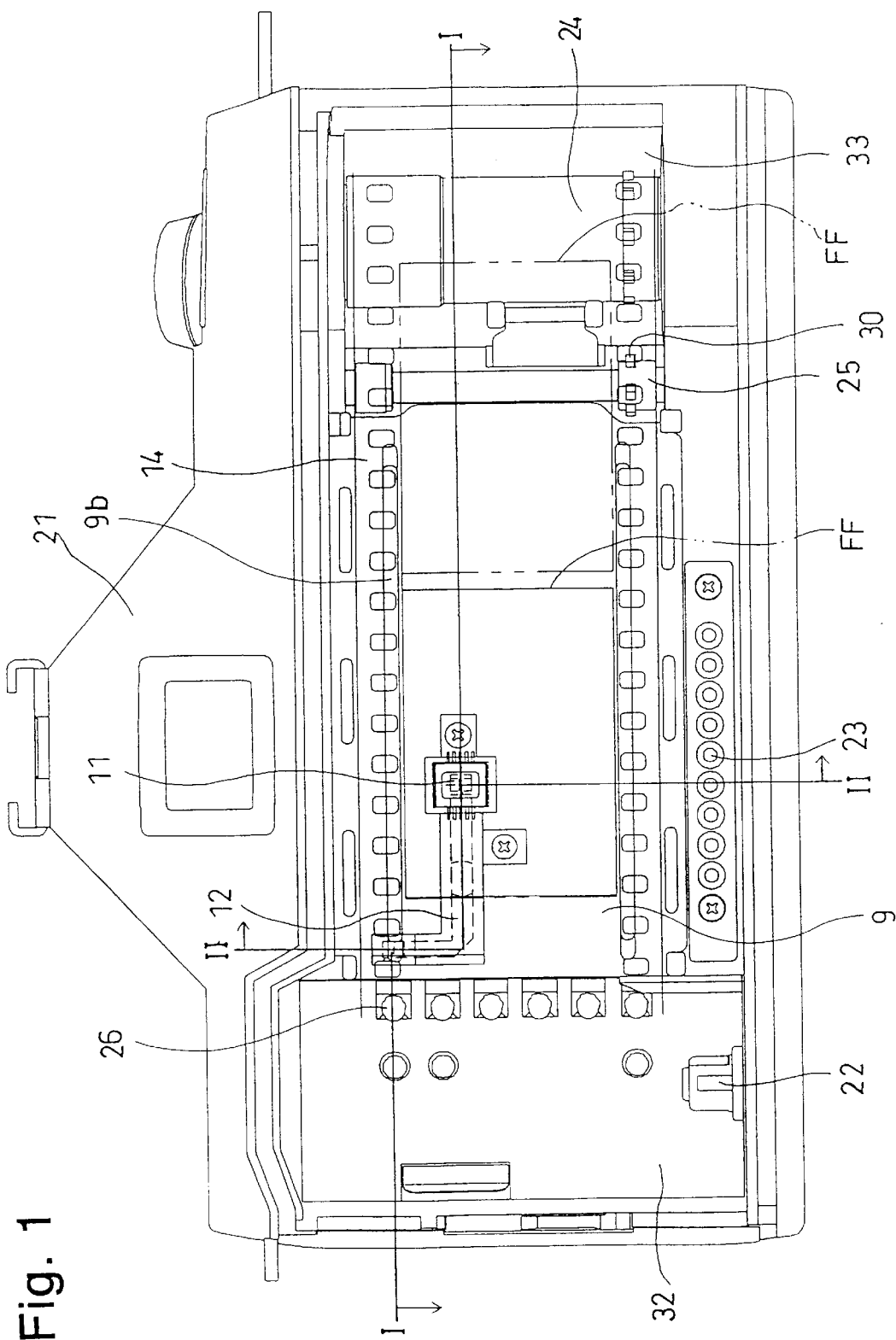
FIG. 1 is a rear elevational view of a camera to which the present invention is applied with the back lid of the camera open.
Figure 2:
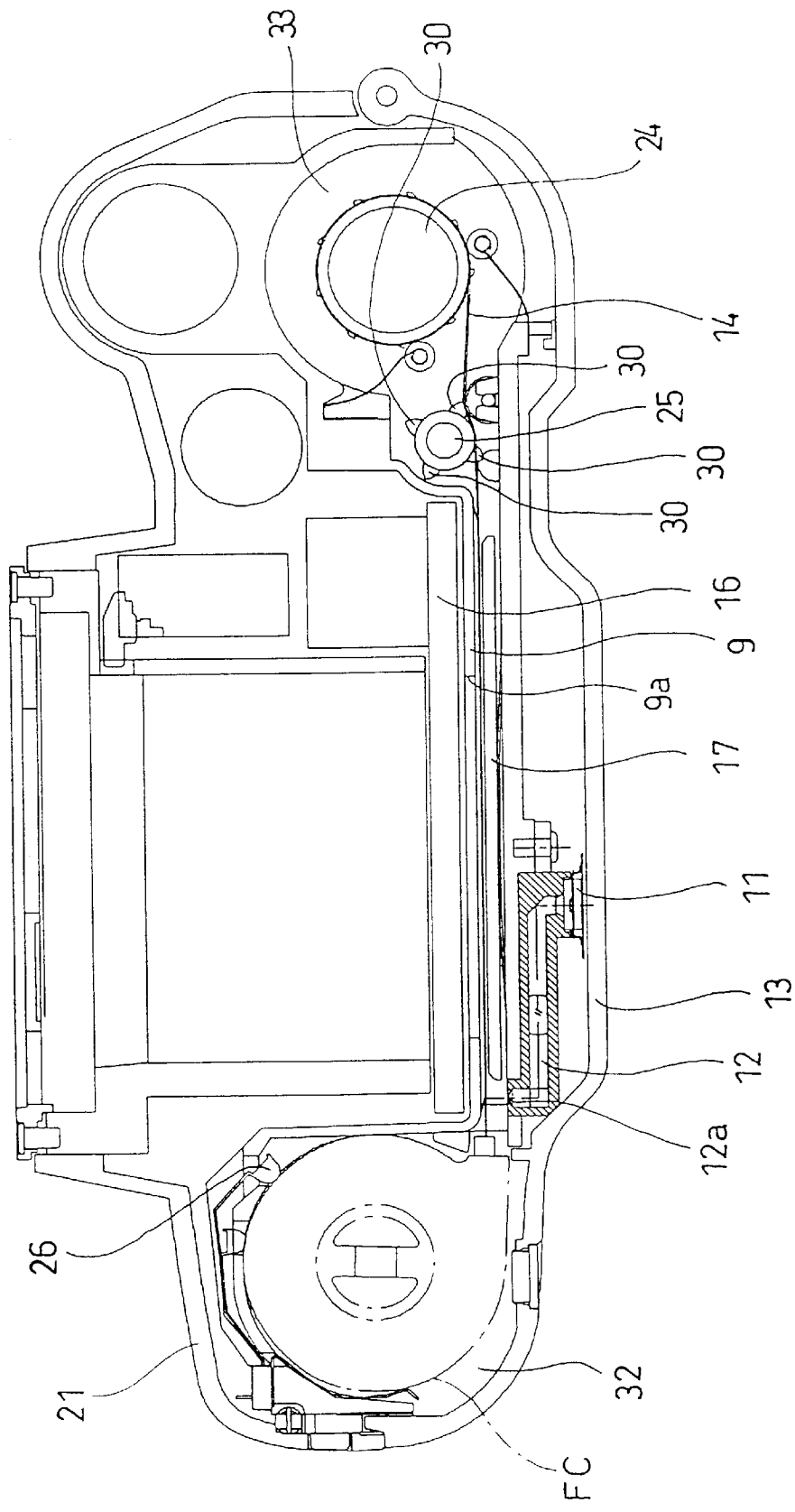
FIG. 2 is a cross sectional view of the camera shown in FIG. 1, taken along the I—I line, viewed in the direction of the appended arrows.
Figure 3:
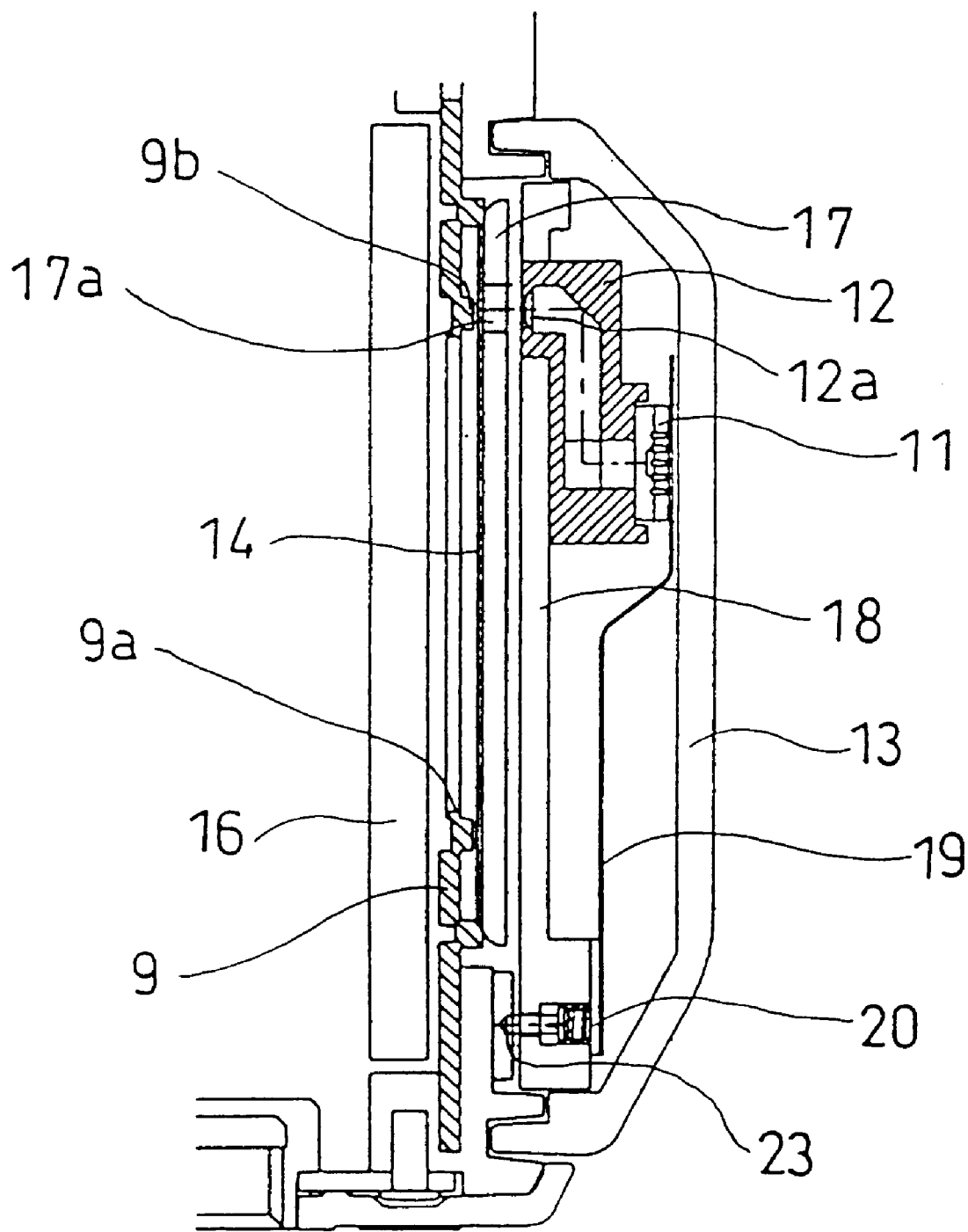
FIG. 3 is a cross sectional view of the camera shown in FIG. 1, taken along the II—II line, viewed in the direction of the appended arrows.

FIG. 1 shows an embodiment of an SLR camera having a data imprinting function, with the back lid thereof open. The SLR camera is provided with an electronic control circuit which controls the exposure operation, the shutter release operation and other operations of the camera. The SLR camera is provided with a data imprinting device which is composed of an LED character generator 11 and a light-guide optical system 12. Although the data imprinting device is mounted on the back lid 13 (see FIG. 2) which is rotatably connected to a camera body 21, the data imprinting device is shown in FIG. 1 for the purpose of illustration. FIG. 2 is a cross sectional view of the camera, taken along the I—I line, viewed in the direction of the appended arrows. The camera body 21 is provided at the left and right ends thereof with a film chamber 32 and a spool chamber 33, respectively, as viewed in FIG. 1. A film cartridge (a standard 35mm film cassette) FC, shown by one-dot chain line in FIG. 2, is loaded in the film chamber 32, while a film take-up spool 24 is positioned in the spool chamber 33. The camera is provided in the film chamber 32 with a rewind shaft 22 and DX-information pins 26. The total number of DX-information pins 26 are nine; the right row includes six pins and the left row includes three pins as viewed in FIG. 1. Four of the nine pins area utilized for detecting the film sensitivity, and two are utilized for reading the lattitude. A sprocket 25 which is engaged with sprocket holes of a film (roll film) 14 to detect the movement of the sprocket holes is positioned on the immediate left side of the spool chamber 33 as viewed in FIG. 1, so that the upper and lower ends of the sprocket 25 are rotatably held by the camera body 21. The camera is provided between the film chamber 32 and the spool chamber 33 with a shutter unit 16 (see FIG. 2). The camera is further provided, in the back of the camera body 21 at a lower center thereof, with an array of contacts 23. The back lid 13 is provided with a corresponding array of pins 20 (only one of them is shown in FIG. 3) which are brought into contact with the array of contacts 23 upon the back lid 13 being closed. Electrical signals can be sent from the camera body 21 to the back lid 13 and vice versa via the array of contacts 23 and the array of pins 20.

FIG. 3 shows a cross sectional view of part of the camera with the back lid 13 being closed, looking from the left side of the camera as viewed in FIG. 1. The back lid 13 is provided with a pressure plate 17 which maintains the flatness of the film 14, and a base plate 18. The back lid 13 is further provided between the base plate 18 and the back lid 13 with the LED character generator 11 and the light-guide optical system 12, which are fundamental elements of the data imprinting device. The character generator 11 is provided with an LED light emitter having multiple-dots (e.g. 7 dots) aligned vertically to emit light in accordance with character information. The light-guide optical system 12 leads the light emitted by the character generator 11 to a character imprinting portion 12a (the exit surface of the light-guide optical system 12). The light-guide optical system 12 is provided with a plurality of reflecting surfaces which change the arrangement of the array of multiple-dots to an appropriate arrangement at an imprinting position on the film 14. A tiny window or opening (see FIG. 3) 17a is formed on the pressure plate 17 at a position opposed to an upper inner film guide rail 9b formed on an aperture frame 9 having a rectangular. photographic aperture 9a. The upper inner film guide rail 9b is formed on the aperture frame 9 so that the sprocket holes formed on the upper side of the film 14 therealong as viewed in FIG. 1 travel on the upper inner film guide rail 9b. As can be seen in FIG. 3, the character imprinting portion 12a of the light-guide optical system 12 is positioned behind the tiny window 17a. Accordingly, it can be understood that the light emitted by the character generator 11 to imprint photographic data on the film 14 is projected to the film 14 via the light-guide optical system 12 from the side of the film base surface of the film 14, not from the sensitive surface side of the film 14. The character generator 11 emits light to be projected towards the film 14 between two adjacent sprocket holes to be exposed thereon in accordance with character information output from a CPU 34 (see FIG. 5). The emitted light carries a certain image of a pattern of characters and is incident on the back of the film 14 via the light-guide optical system 12 and the tiny window 17a to thereby imprint the photographic data on the film 14 as a latent image.

The back lid 13 is provided in a lower portion thereof with the aforementioned array of pins 20. These pins 20 are electrically connected with the character generator 11 via a flexible wiring board 19 (see FIG. 3) so that electrical signals can be sent from the camera body 21 to the character generator 11 via the flexible wiring board 19, the array of pins 20 and the array of contacts 23.

Figure 4:
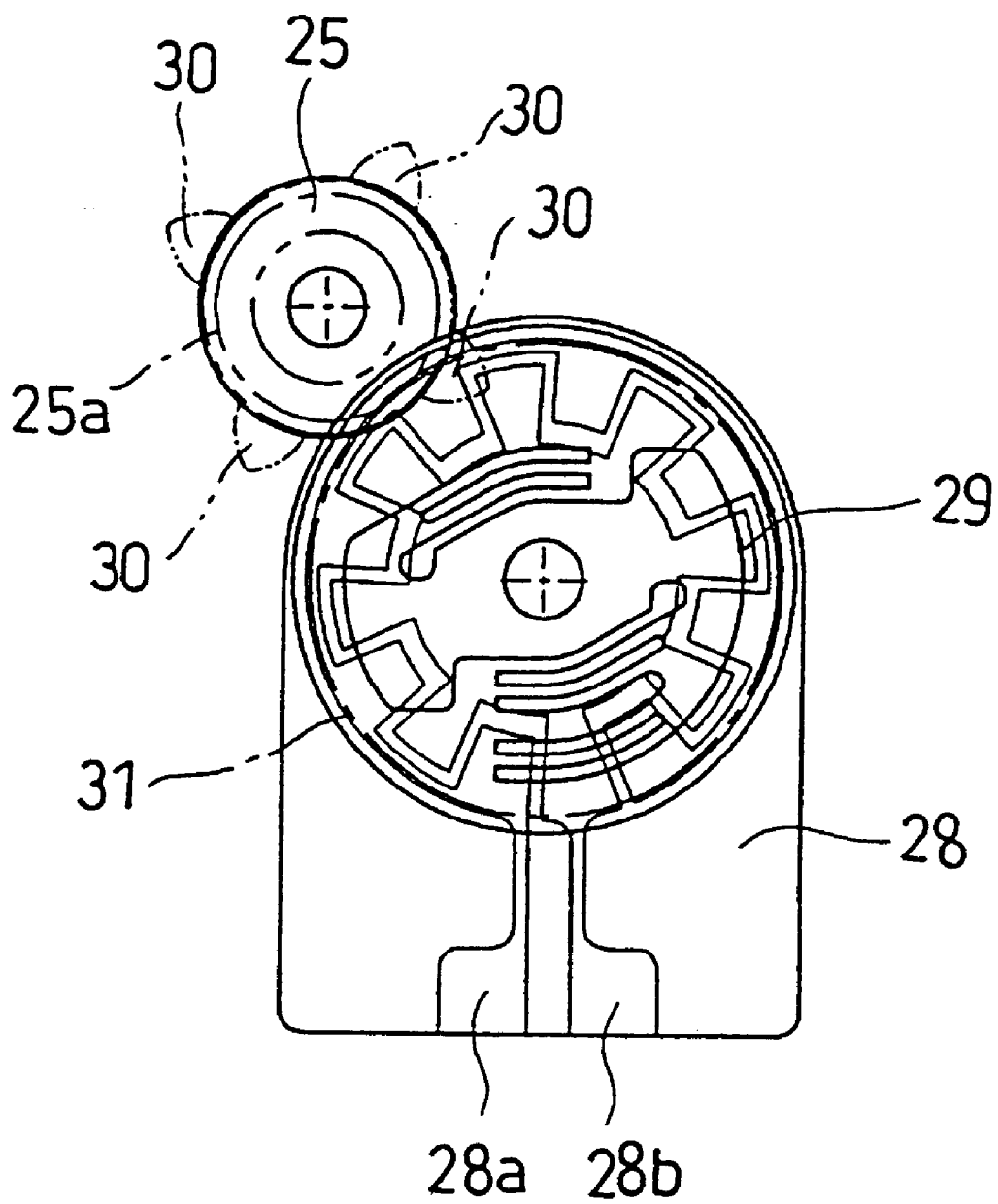
FIG. 4 is a plan view of a sprocket-hole detecting device of the camera shown in FIG. 1.

Referring to FIG. 4, the sprocket 25 is provided around the lower end thereof with four projections 30 which extend radially and outwardly at regular intervals. At least one of the four projections 30 is engaged with any sprocket hole of the film 14 (see FIG. 2) at a time, so that the sprocket 25 rotates while the film 14 is wound or rewound. The sprocket 25 is provided at one end thereof with a gear 25a which is in constant mesh with a gear 31 to which a brush 29 is fixed. The brush 29 is positioned on a detector board 28 to contact a predetermined code pattern printed thereon. Therefore, rotation of the sprocket 25 causes the brush 29 to rotate and slide on the code pattern of the detector board 28. With this mechanism, rotation of the sprocket 25 is detected. Each time the brush 29 rotates by a predetermined angle of rotation, two output terminals 28a and 28b on the detector board 28 are electrically connected and disconnected alternately. One of the output terminals 28a and 28b is grounded, so that the level of the signal output from the other output terminal alternately changes between a high level and a low level; this electric device is hereinafter referred to as film switch 58 (see FIG. 5). The CPU 34 (which functions as a film speed detecting device) detects the variation in level of the signal output from the other output terminal 28a or 28b as pulses (film pulses) generated by the movement of the film 14.

Figure 16A:
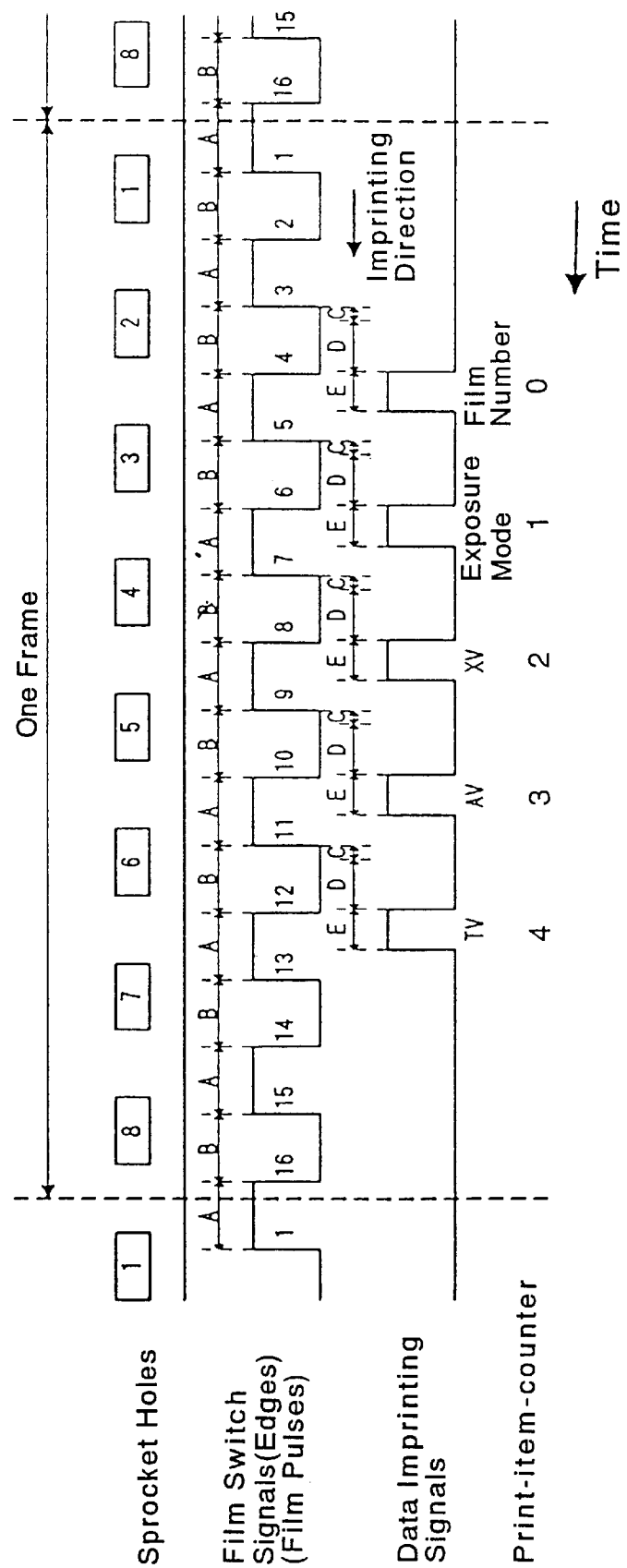
FIG. 16A is a time chart showing a correlation between sprocket holes of film and each film pulse at the time of rewinding film in the camera to which the present invention is applied.
Figure 16B:
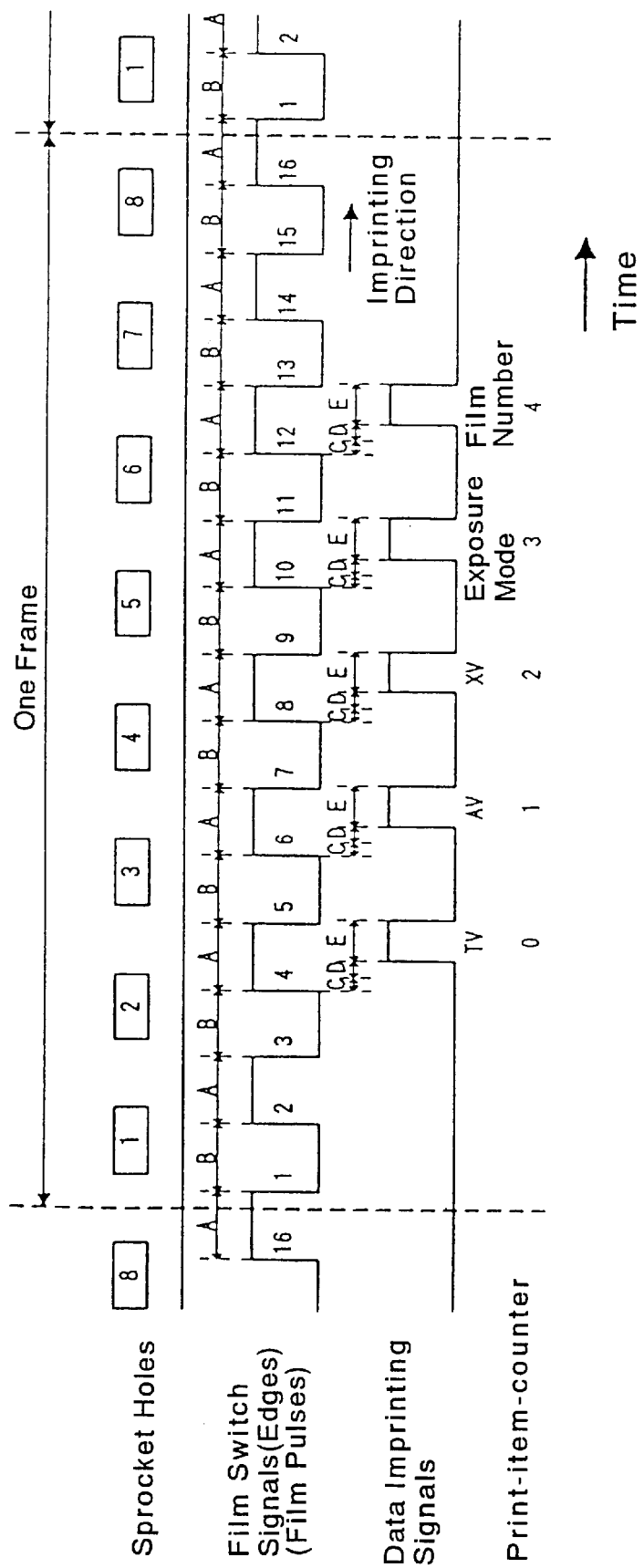
FIG. 16B is a time chart showing a correlation between sprocket holes of film and each film pulse at the time of winding film in the camera to which the present invention is applied.

FIGS. 16A and 16B each shows a time chart illustrating a correlation between the sprocket holes of the film 14 and each film pulse, in the case of imprinting photographic data on the film 14 between two adjacent sprocket holes thereof. The horizontal axis of the time chart represents time. Each film frame FF has eight consecutive sprocket holes on each side of the film 14 (see FIG. 18). Therefore, since photographic data can be imprinted on the film 14 between any two adjacent sprocket holes, there are technically seven areas available for photographic data to be imprinted therein for each film frame FF. However, in the present embodiment, only five different photographic data (Time Value TV, Aperture Value AV, Exposure Compensation Value XV, Exposure Mode and Frame Number) are imprinted for each film frame FF (see FIGS. 16A, 16B and 18). In each area between two adjacent sprocket holes on the film 14, four characters are imprinted at maximum. Each of the four characters is formed by a matrix of seven dots by five dots. FIG. 16A shows the case where the film 14 moves in the direction from left to right as viewed in FIG. 16A when the film 14 is rewound to be accommodated in the film cartridge FC, while FIG. 16B shows the case where the film 14 moves in the direction from right to left as viewed in FIG. 16B when the film 14 is wound around the film take-up spool 24. Each film switch signal (i.e., the film pulse) shown in FIGS. 16A and 16B is a low level/high-level pulse signal which is generated by the film switch 58 when the two output terminals 28a and 28b thereof are electrically connected and disconnected. The level of the film switch signal varies each time an edge of each sprocket hole passes a predetermined position. The CPU 34 (which functions as a common detecting device including the function of a sprocket-hole detecting device and the function of the above-mentioned film speed detecting device) detects which edge of the sprocket holes of the film 14 has passed the predetermined position by detecting the variation of the level of the film switch signal to thereby detect the positions of the sprocket holes. The data imprinting device starts imprinting photographic data from a position determined in accordance with the positions of sprocket holes. In FIGS. 16A and 16B, each reference letter "A" represents the duration of the high level of a film pulse, each reference letter "B" represents the duration of the low level, and each reference letter "E" represents the time necessary for photographic data to be imprinted between two adjacent sprocket holes. In the data imprinting operation, in order to control the data imprinting device to start imprinting photographic data after a predetermined period of time elapses from the moment of detection that the level of the film pulse varies from high to low, a first delay time "C" necessary for converting four characters which are to be imprinted between two adjacent sprocket holes of the film 14 into photographic data, and also a second delay time "D" which is calculated in accordance with the speed of movement of the film 14, are utilized. With these first and second delay times, the position of commencement of data-imprinting between two adjacent sprocket holes can be controlled.

FIG. 17 is an enlarged view of part of the time chart shown in FIG. 16A. The data imprinting operation includes an imprinting function wherein, in order to imprint each character formed by a matrix of seven dots by five dots (the matrix constituting one unit of data), the five columns of the matrix (each of which is formed by seven dots) are intermittently imprinted column by column on the film 14 between two adjacent sprocket holes thereof by controlling the character generator 11 to emit light for each column by a data imprinting time (light-emission duration) "G" determined in accordance with the ISO speed information of the film 14 per cycle (data imprinting period) "F" of the pulse signals determined by calculation in accordance with the detected speed of movement of the film 14. The width of each space between two adjacent imprinting characters among the four characters of photographic data is predetermined to correspond to one dot, i.e., one column. Since the data imprinting operation is carried out in such a manner using the cycle "F" of the pulse signals determined by calculation in accordance with the detected speed of movement of the film 14, the width of each character pattern exposed on film is maintained constant. FIG. 18 shows part of the film 14 on which different photographic data (Time Value TV, Aperture Value AV, Exposure Compensation Value XV, Exposure Mode and Frame Number) are imprinted for each film frame by the data imprinting device of the present embodiment of the camera.

Figure 5:
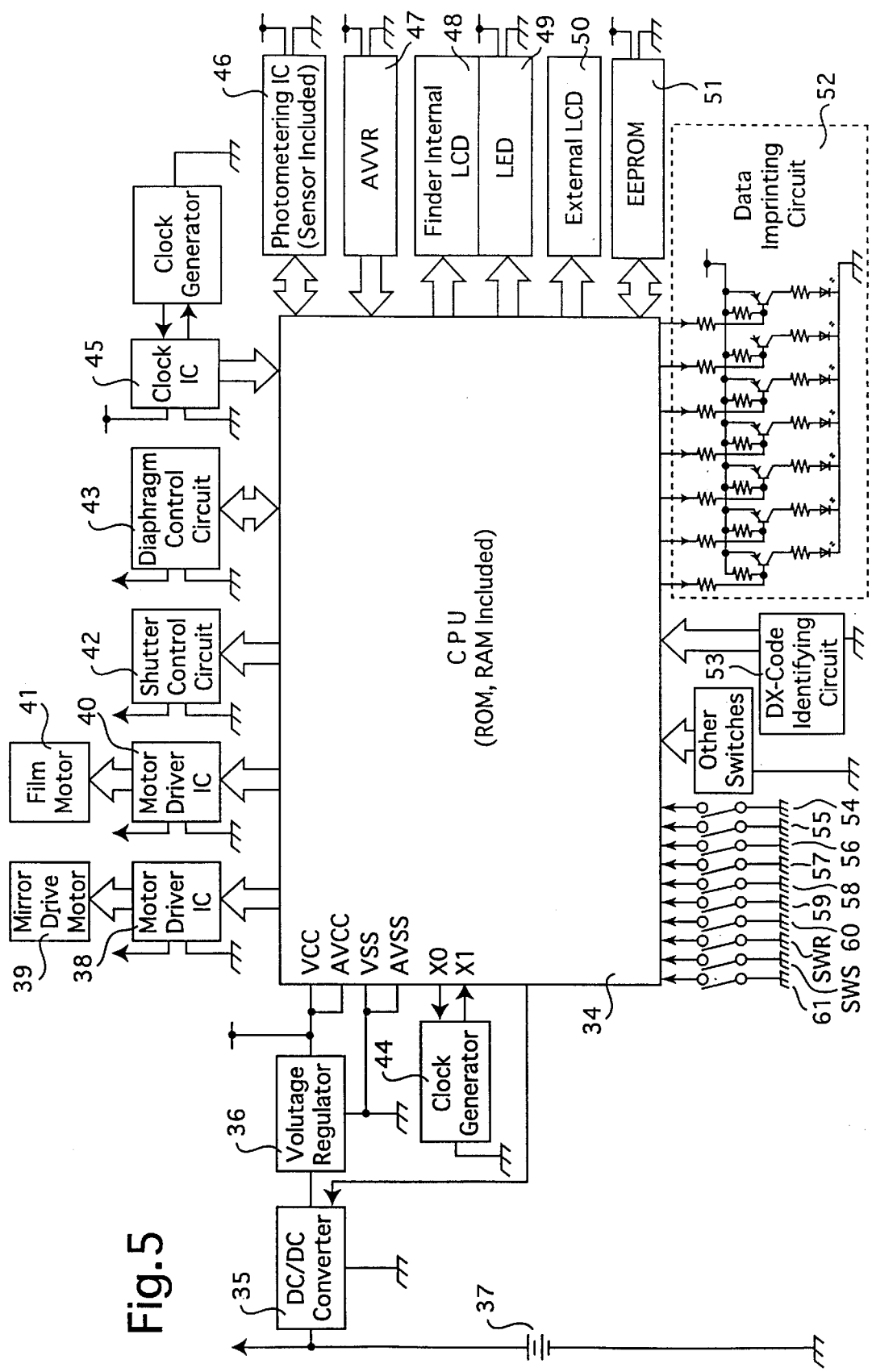
FIG. 5 is a block diagram of a control circuit of the camera shown in FIG. 1.

FIG. 5 is a block diagram of a control circuit of the present embodiment of the SLR camera. The control circuit is provided with the CPU 34 including ROMs and RAMs therein. The control circuit is further provided with a DC/DC converter 35, a voltage regulator 36, a motor driver IC 38, a mirror drive motor 39, a motor driver IC 40, a film winding/rewinding motor 41, a shutter control circuit 42, a diaphragm control circuit 43, a clock generator 44, a clock IC 45, a photometer IC 46, an AVVR (Aperture Value Variable Resistor) 47, a viewfinder internal LCD 48, an LED 49, an external LCD 50, an EEPROM 51, a data imprinting circuit 52, a DX code identifying circuit 53, and various switches which are all connected to the CPU 34. Note that since the present embodiment of the camera is an SLR camera, the camera is provided in the camera body 21 with a quick-return mirror (not shown) which reflects light passed through the photographic optical system (interchangeable lens) towards the finder optical system immediately before a shutter release. A battery 37 as power supply, which is accommodated in a battery chamber of the camera, is connected to the CPU 34 via the DC/DC converter 35 and the voltage regulator 36. The mirror drive motor 39 and the film winding/rewinding motor 41 which function as drive devices are connected to the CPU 34 via the motor drivers IC 38 and 40, respectively. The shutter control circuit 42, the diaphragm control circuit 43, the data imprinting circuit 52 and the DX code identifying circuit 53 which function as circuit devices are connected to the CPU 34. The data imprinting circuit 52 controls the operation of imprinting photographic data between two adjacent sprocket holes of the film 14. The DX code identifying circuit 53 identifies a DX code printed on the film cartridge FC via the DX-information pins 26. The photometer IC 46 and the AVVR 47 which function as sensor devices are connected to the CPU 34. The photometer IC 46 is used for the automatic exposure control of the camera while the AVVR 47 is used to detect the size of the diaphragm. The viewfinder internal LCD 48 indicates various photographic information in the field of view of the viewfinder. The LED 49 illuminates the LCD 48. The external LCD 50 indicates various photographic information such as the selected photographic mode and film information (the number of remaining frames, ISO speed information, etc.) at an appropriate position on the camera body 21.

A main switch 61 functions as the power switch for the camera. A photometering switch SWS which is turned ON upon the release button of the camera being half depressed, a release switch SWR which is turned ON upon the release button of the camera being fully depressed, the aforementioned film switch 58 for generating film pulses by movement of the film 14, and a data-imprinting permission switch 54 which turns the emission of the character generator 11 ON and OFF are connected to the CPU 34. Furthermore, a back-lid switch 60 for detecting whether the back lid 13 is open or closed, a mirror-up switch 56 for detecting whether the quick-return mirror is positioned at the upper end position (raised position) thereof, a mirror-down switch 55 for detecting whether the quick-return mirror is positioned at the lower end position (initial position) thereof, a mid-roll rewind switch 59, a film cartridge switch 57 for detecting whether the film cartridge. FC in is the film chamber 32, are also connected to the CPU 34. The EEPROM 51 stores various photographic data and parameters. The clock generator 44 generates drive clock pulses for the CPU 34. The clock IC 45 counts the time and date.

Figure 6:
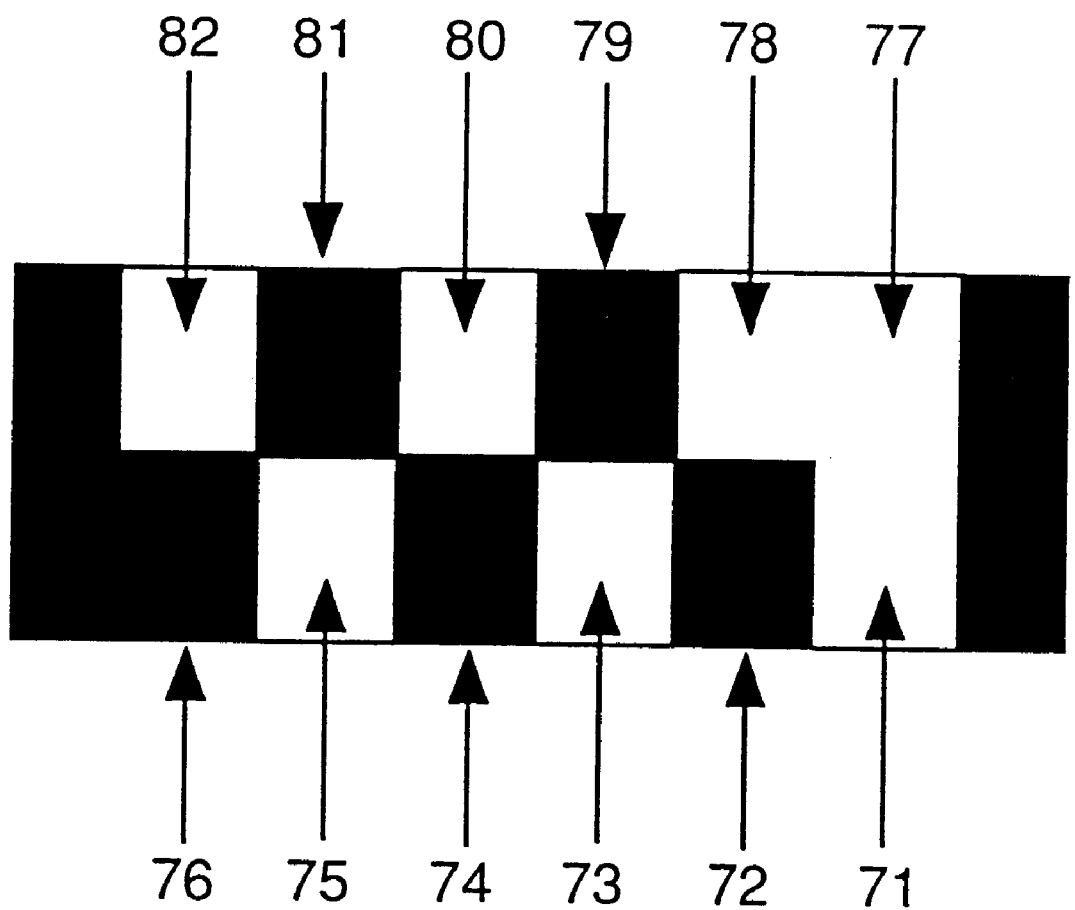
FIG. 6 is a plan view of a DX code.

DX code (DX recognition), which is printed on the sleeve of the film cassette FC and identified by the DX code identifying circuit 53 (film-type identifying device), has a checkered pattern of conductive and non-conductive squares (detection squares) as shown in FIG. 6. The white squares and black squares shown in FIG. 6 represent the conductive squares and the non-conductive squares, respectively. A combination of the conductive and non-conductive squares represents specific film information. DX code is generally provided with twelve detection squares (conductive and non-conductive squares) 71 through 82 in total.

The DX code identifying circuit 53 also functions as a latitude identifying device, wherein latitude data can be read therefrom. Latitude data is represented by the combination of conductive and non-conductive squares of two detection squares 81 and 82. Therefore, four different latitudes can be represented by changing the pattern of the two detection squares 81 and 82. Table 1 below shows four different latitudes represented by four different combinations of the two detection squares 81 and 82. In Table 1, a conductive square is represented by "0" while a non-conductive square is represented by "1".

TABLE 1

| Latitude | 81 | 82 |
|---|---|---|
| ±½ | 1 | 1 |
| ±1 | 0 | 1 |
| +2, −1 | 1 | 0 |
| +3. −3 | 0 | 0 |

The ISO speed (i.e., the sensitivity of the film) can be identified by the DX code identifying circuit 53 (wherein sensitivity data can be read therefrom) via the combination of five detection squares (conductive and non-conductive squares) 72 through 76. The number of exposures is represented by the combination of three detection squares (conductive and non-conductive squares) 78, 79 and 80. The remaining two detection squares 71 and 77 are used as grounds.

Figure 7:
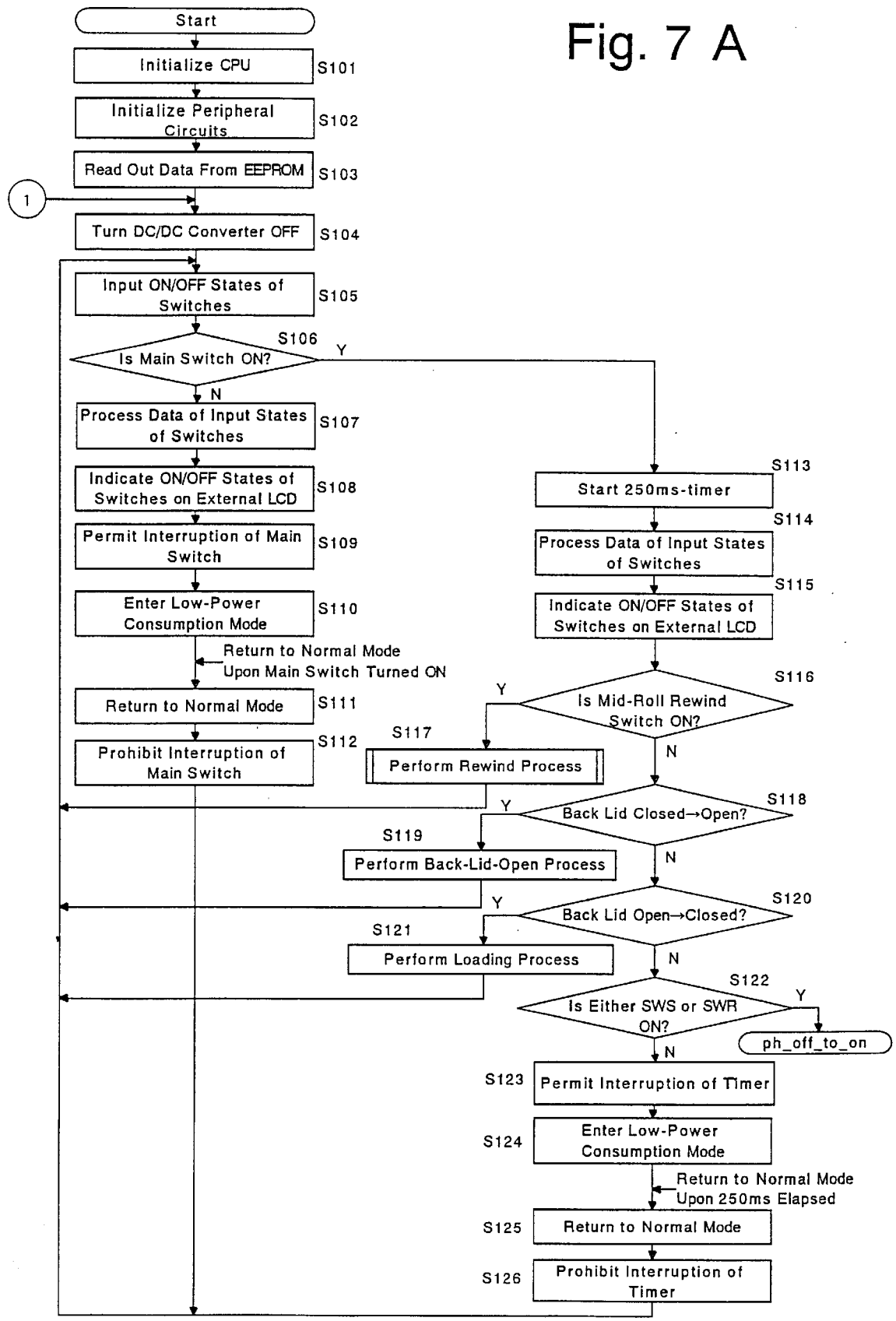
FIG. 7A is a part of flow chart of the main routine of the camera shown in FIG. 1.
FIG. 7B is a part of flow chart of the main routine of the camera shown in FIG. 1.
Figure 7:
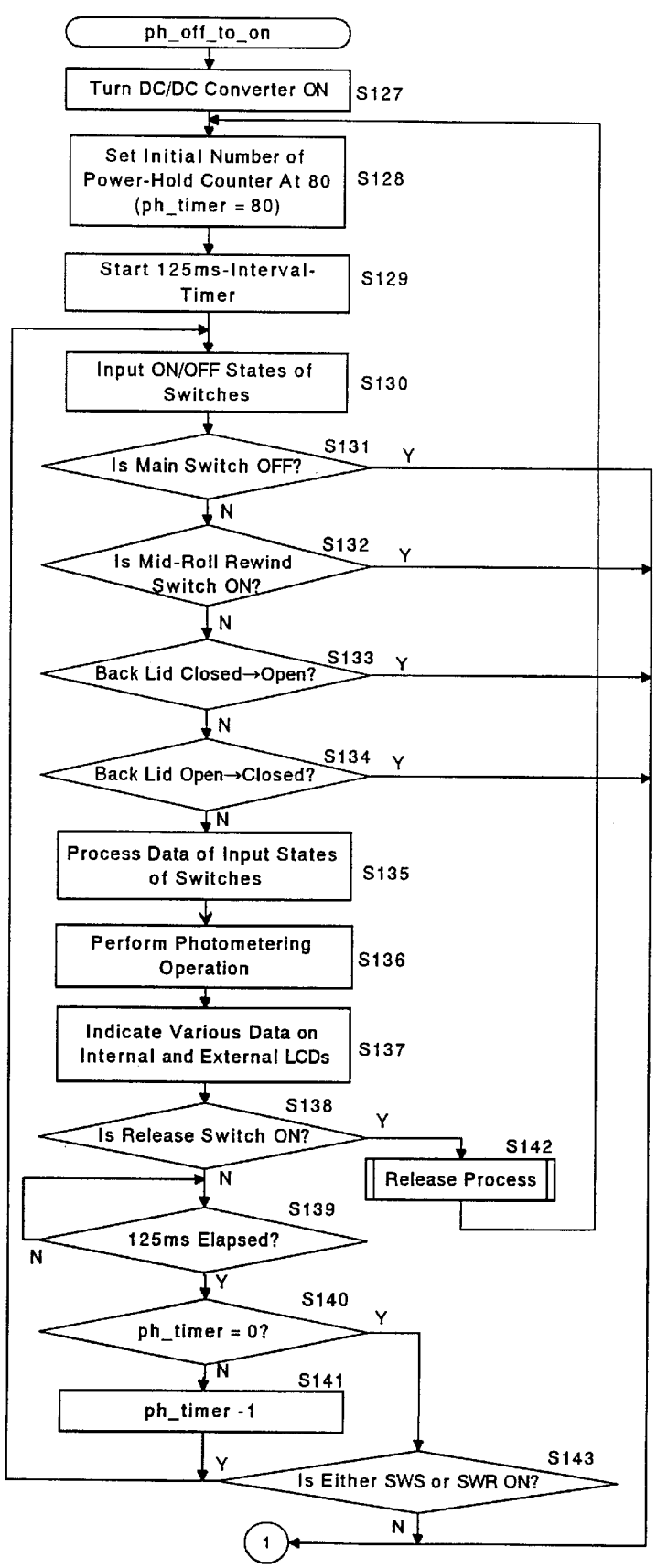

Control of the camera of the present embodiment will be hereinafter discussed with reference to FIGS. 7A and 7B, each showing a flow chart of part of the main routine of the camera. The CPU 34 performs all the operations and processes contained in the main routine shown in FIGS. 7A and 7B. Control enters the main routine immediately after the battery 37 is loaded into the camera. At first., the CPU 34 and peripheral circuits are initialized (steps S101 and S102). Subsequently, data stored in the EEPROM 51 is read out to be input to the internal RAM of the CPU 34 (step S103), and the DC/DC converter 35 is turned OFF (step S104). Thereafter, the ON/OFF states of all the switches are input to the CPU 34 (step S105). Subsequently, it is determined whether the main switch 61 is ON (step S106). If it is determined that the main switch 61 is not ON, data of the ON/OFF states of all the switches is processed to be indicated on the external LCD panel 50 (steps S107 and S108). Subsequently, interruption of the main switch 61 is permitted (step S109), and the camera falls into a low-power consumption mode, i.e., a sleep mode (step S110). The camera returns to a normal mode immediately after the main switch 61 is turned ON (step Sill). Thereafter, interruption of the main switch 61 is prohibited (step S112), control returns to step S105, and the operations from step S105 to step S112 are repeated.

If it is determined at step S106 that the main switch 61 is ON, a 250 ms timer in the CPU 34 starts, in preparation for the photographing process (step S113). Subsequently, data of the ON/OFF states of all the switches which are input to the CPU 34 at step S105 is processed to be indicated on the external LCD panel 50 (steps S114 and S115). Subsequently, it is determined whether the mid-roll rewind switch 59 is ON (step S116). If it is determined that the mid-roll rewind switch 59 is ON, indicating that the mid-roll rewind switch 59 has been depressed, the rewind process is performed (step S117). After the rewind process is completed, control returns to step S105. In the rewind process, the data imprinting device operates to imprint photographic data on the film 14. The details of the rewind process will be discussed later. If it is determined at step S116 that the mid-roll rewind switch 59 is OFF, it is determined whether the state of the back lid 13 has changed from a closed state to an open state (step S118). If it is determined that the state of the back lid 13 has changed from a closed state to an open state, the back-lid-open process is performed (step S119) and subsequently control returns to step S105. If it is determined at step S118 that the state of the back lid 13 has not changed from a closed state to an open state, it is determined whether the state of the back lid 13 has changed from an open state to a closed state (step S120). If it is determined that the state of the back lid 13 has changed from an open state to a closed state, indicating that the film cartridge FC may have been loaded into the camera, the loading process is performed (step S121) and subsequently control returns to step S105. Note that the DX code is read at step S121. If the back lid 13 remains closed, it is determined whether either the photometering switch SWS or the release switch SWR is ON, i.e., whether the release button is in the state of being half or fully depressed (step S122). If neither switch SWS nor SWR is ON, interruption of the timer is permitted (step S123), and the camera falls into the low-power consumption mode, i.e., the sleep mode (step S124). Subsequently, the camera returns to the normal mode immediately after the 250 ms timer elapses (step S124). Thereafter, interruption of the timer is prohibited (step S126), and control returns to step S105.

If it is determined at step S122 that either the photometering switch SWS or the release switch SWR is ON, i.e., the release button is. in the state of being at least half depressed (FIG. 7B), the DC/DC converter 35 is turned ON in preparation for the release process of step S142 (step S127). Subsequently, the initial number of a power-hold counter in the CPU 34 is set to 80 (step S128), and a 125 ms interval timer in the CPU 34 starts (step S129). Namely, after the photometering switch SWS is turned ON, a power-holding time for holding the camera in the normal mode is set to 10 seconds (=80×125 (ms)) so that the camera does not fall into the sleep mode until the power-holding time elapses. Thereafter, the ON/OFF states of all the switches are input to the CPU 34 (step S130). Subsequently, it is determined whether the main switch 61 is OFF (step S131). If it is determined at step S131 that the main switch 61 is OFF, it is no longer necessary for the camera to be held in the normal mode, therefore control returns to step S104. If it is determined at step S131 that the main switch 61 is not OFF, it is determined whether the mid-roll rewind switch 59 is ON (step S132). If it is determined that the mid-roll rewind switch 59 is ON, control returns to step S104 in order to perform the rewind operation at step S117. If it is determined at step S132 that the mid-roll rewind switch 59 is not ON, it is determined whether the state of the back lid 13 has changed from a closed state to an open state (step S133). If it is determined that the state of the back lid 13 has changed from a closed state to an open state, control returns to step S104 to perform the back-lid-open process at step S119. If it is determined at step S133 that the state of the back lid 13 has not changed from a closed state to an open state, it is determined whether the state of the back lid 13 has changed from an open state to a closed state (step S134). If it is determined at step S134 that the state of the back lid 13 has changed from an open state to a closed state, control returns to step S104 to perform the loading process at step S121. If the back lid 13 remains closed, data which varies due to the variation of the ON/OFF state of each switch is renewed (step S135).

Subsequently, the photometering operation is performed (step S136), and the indicating process for indicating various photographic data on each of the internal and external LCDs 48 and 50 is performed (step S137).

Subsequently, it is determined whether the release switch SWR is ON (step S138), and the release process is performed (step S142) in the case where the release switch SWR is ON. If it is determined at step S138 that the release switch SWR is not ON, it is determined whether the 125 ms interval timer has elapsed (step S139). The operation at step S139 is repeated until the 125 ms elapses. Immediately after the 125 ms has elapsed, it is determined whether the value of the power-hold timer is zero (step S140). If the value of the power-hold timer is not zero, the number is decreased by one (step S141), and control returns to step S130 so that the operations from step S130 to step S141 are repeated until the value of the power-hold timer is zero. If it is determined at step S140 that the value of the power-hold timer is zero, it is determined whether either the photometering switch SWS or the release switch SWR is ON (step S143). If either switch SWS or SWR is ON, indicating that the release button is still in the state of being at least half depressed, control returns to step S130 in preparation for the release process of step S142. If neither switch SWS nor SWR is ON, control returns to step S104.

Figure 8:
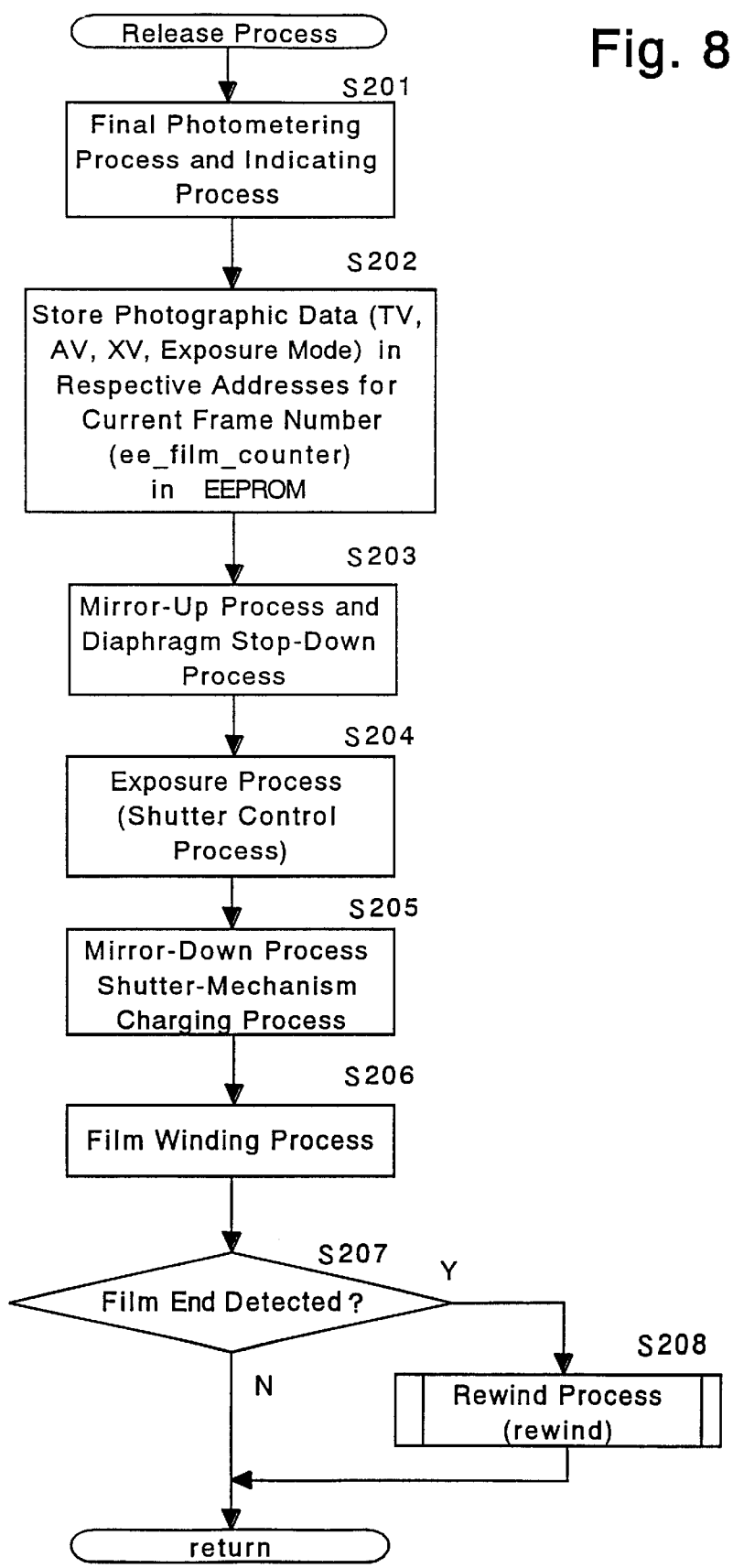
FIG. 8 is a flow chart of the release process of the camera shown in FIG. 1.

The release process performed at step S142 will be hereinafter discussed with reference to FIG. 8 which shows a flow chart thereof. As shown in the release process flow chart, the exposure process, in which the diaphragm and the quick-return mirror are actuated, is performed immediately after the release switch is fully depressed. In the release process, firstly the final photometering process and the indicating process are performed before the shutter is released (step S201). Subsequently, photographic data (Time Value TV, Aperture Value AV, Exposure Compensation Value XV and Exposure Mode) are stored in respective addresses for the current frame number in the EEPROM 51 (step S202). Subsequently, the mirror-up process, the diaphragm stop-down process, the exposure process (shutter control process), the mirror-down process and the shutter-mechanism charging process are performed (steps S203, S204 and S205). Thereafter, the film winding process is performed (step S206). Subsequently, it is determined whether the film end is detected (step S207). If the film end is detected, the rewind process is performed (step S208) and control returns, otherwise the rewind process is not performed and control returns.

Figure 9:
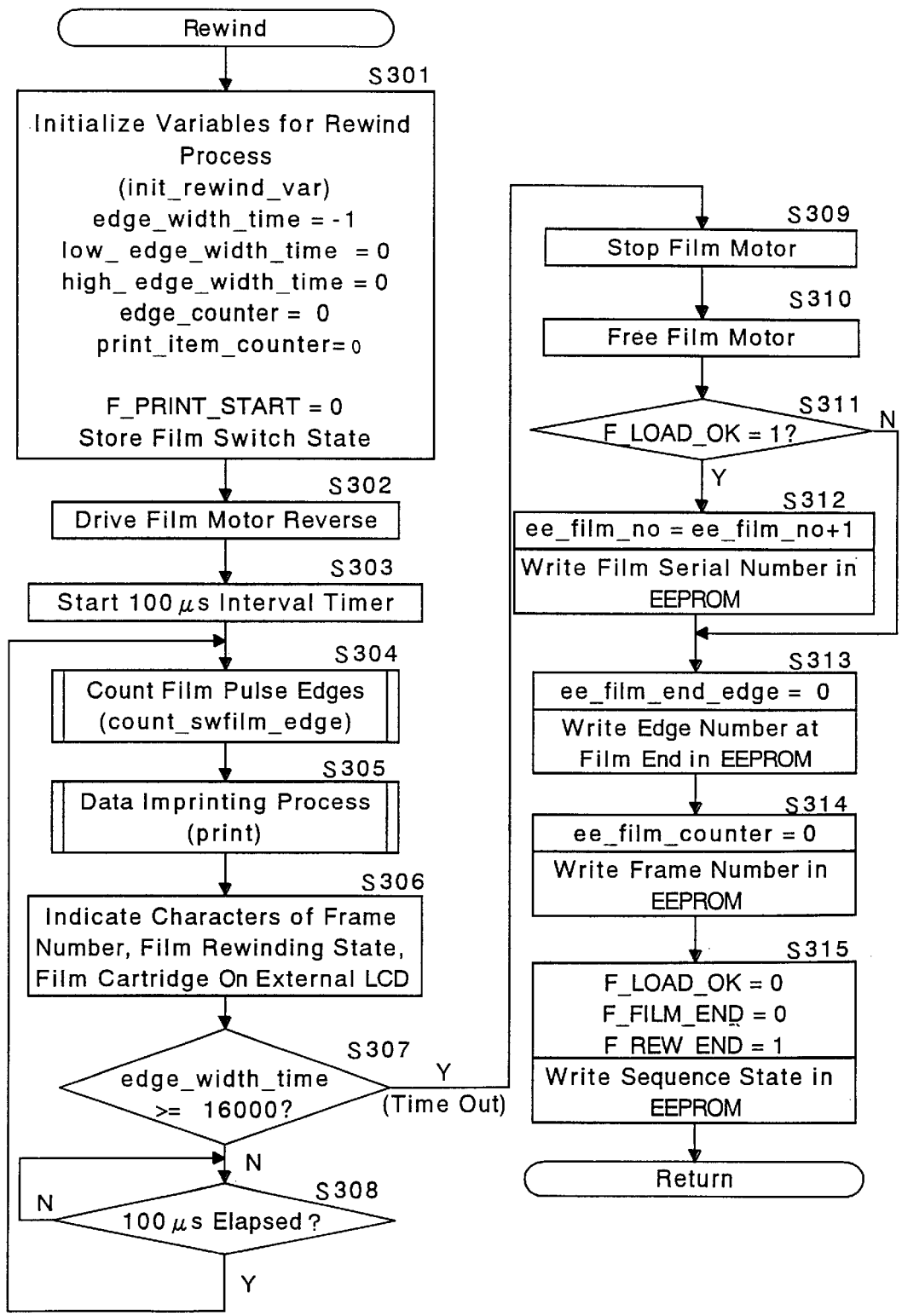
FIG. 9 is a flow chart of the rewinding process of the camera shown in FIG. 1 in which the data imprinting process is performed.

The rewind process performed at steps S117 and S208 will be hereinafter discussed with reference to FIG. 9 which shows a flow chart thereof. In the rewind process, firstly all the variables for the rewind process are initialized while the state of the film switch 58 is stored in the internal RAM of the CPU 34 (step S301). Subsequently, the film winding/rewinding motor 41 is driven to reverse the drive shaft thereof to rewind the film 14 (step S302), and a 100 $\mu$s interval timer in the CPU 34 starts (step S303). The 100 $\mu$s interval timer defines the period for repeating the operations from step S304 to step S308. Subsequently, the leading and trailing edges (designated by the reference numerals 1 through 16 for each frame as shown in FIG. 16) of the film pulses generated by the movement of the film 14 are counted (step S304). Subsequently, the data imprinting process is performed (step S305), and a character or characters showing the number of film frame and/or a character having the shape of a film cartridge FC are indicated on the external LCD 50 to inform the user that the film 14 is now being rewound (step S306). Subsequently, it is determined whether the total counted number of a pulse-width measuring counter (edge_width_time) in the CPU 34 that is used for measuring a half of the period of the film pulse is over 16,000, i.e., whether 1.6 seconds has elapsed since the aforementioned 100 $\mu$s interval timer started (step S307). If it is determined at step S307 that 1.6 seconds has not yet elapsed, it is determined whether 100 $\mu$s has elapsed (step S308). The operation at step S308 is repeated until 100 $\mu$s has elapsed thereat. If it is determined at step S308 that 100 $\mu$s has elapsed, control returns to step S304. Accordingly, the operations from step S304 to S308 are repeated until it is determined at step S307 that 1.6 seconds has elapsed since the aforementioned 100 μs interval timer started. The number of the pulse-width measuring counter (edge_width_time) increases by one every time 100 μs elapses.

If it is determined at step S307 that 1.6 seconds has elapsed without any variation of the film pulses'level, indicating that the film 14 has been completely rewound, the power supply to the film winding/rewinding motor 41 is stopped in order to stop the film winding/rewinding motor 41 (step S309), and the film winding/rewinding motor 41 is freed from control (step S310). Subsequently, it is determined whether a normal-loading completion (F_LOAD_OK) is 1 (step S311). If the normal-loading completion (F_LOAD_OK) is 1, indicating that the film cartridge FC has been loaded in the camera, a serial number (ee_film_no) which shows the serial number of the film cartridge FC is increased by one and stored in the EEPROM .51 (step S312). If it is determined at step S311 that the normal-loading completion (F_LOAD_OK) is not 1, control skips the operation at step S312. A film-end-edge counter (ee_film_end_edge), which indicates the number of edges of the film pulses generated within the last inch of the film 14 from the trailing edge of the last frame to the film end, and a film-frame-number counter (ee_film_counter) are each set to 0 and these values are stored in the EEPROM 51 (steps S313 and 314). Subsequently, the normal-loading completion flag (F_LOAD_OK), a film end flag (F_FILM_END) and a rewind end flag (F_REW_END) are set to 0, 0 and 1, respectively, and stored in the EEPROM 51 (step S315). Thereafter control returns.

Figure 10:
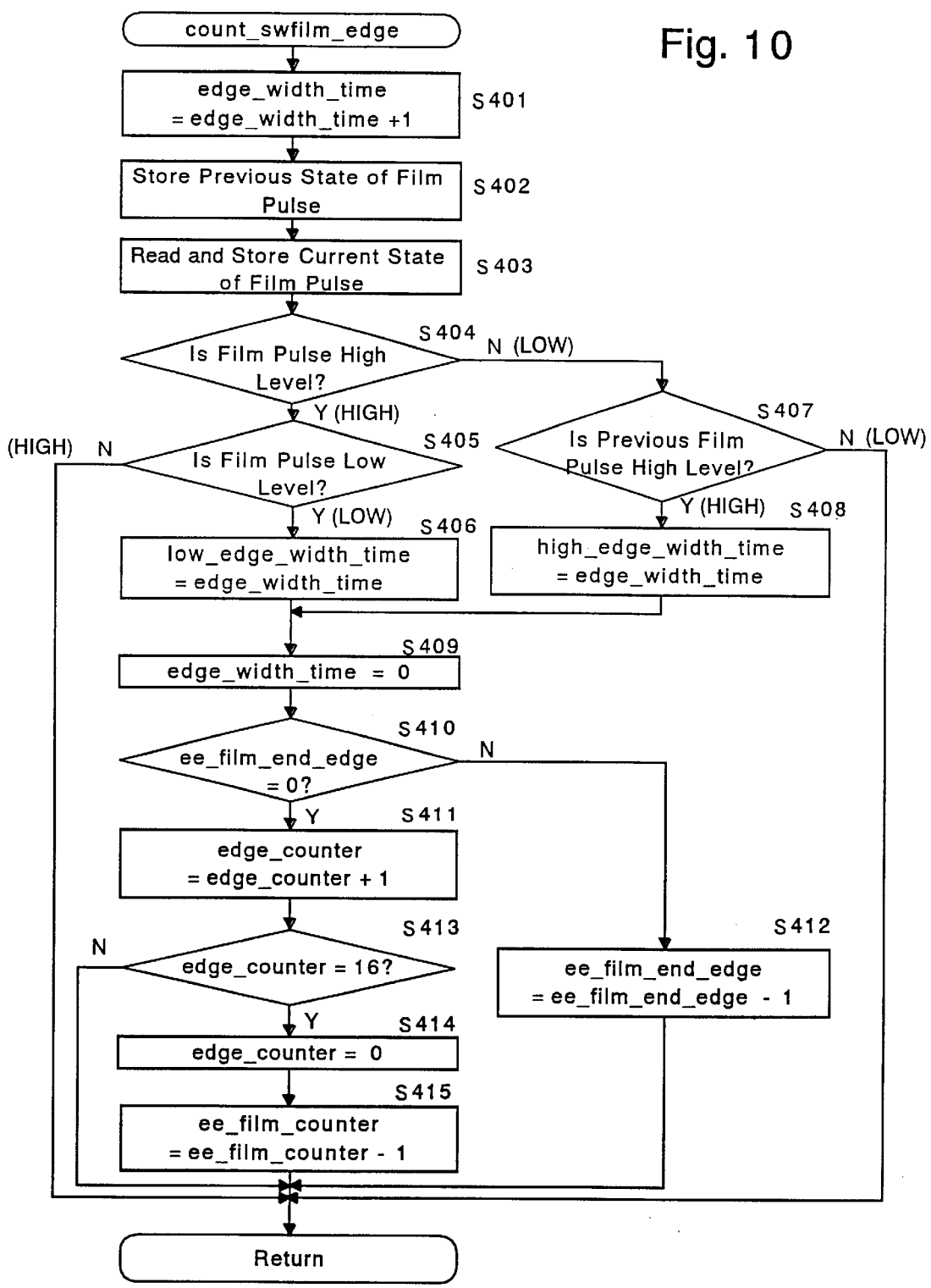
FIG. 10 is a flow chart of a sub-routine in the flow chart shown in FIG. 9.

The process at step S304 in which the leading and trailing edges of the film pulses generated by the movement of the film 14 are counted will be hereinafter discussed with reference to FIG. 10. In this process, the state of the film pulse (i.e., whether the level of the film pulse is low or high) is detected every 100 μs to measure the numerical value shown by the pulse-width measuring counter (edge_width_time), i.e., the period of time from the moment the state of the film pulse changes to the subsequent moment the state of the film pulse changes. In this process, firstly, the pulse-width measuring counter (edge_width_time) is increased by one (step S401). Subsequently the previous state (low level or high level) of the film pulse is stored (e.g., in a register), and the current state of the film pulse is read out to be stored (e.g., in a register) (steps S402 and S403). Subsequently, it is determined whether the level of the current film pulse is high (step S404). If it is detected at step S404 that the level of the current film pulse is high, it is determined whether the level of the previous film pulse is low (step S405). If it is detected at step S405 that the level of the previous film pulse is not low, indicating that the level of the film pulse remains high, the control returns. If it is detected at step S405 that the level of the previous film pulse is low, indicating that the leading edge of film pulse has been detected, the value of the pulse-width measuring counter (edge_width_time) at this moment is stored as a low-pulse width or low-pulse duration (low_edge_width_time) (step S406).

Subsequently, the pulse-width measuring counter (edge_width_time) is set to 0 in order to measure the duration of the high level of the film pulse (step S409). Subsequently, it is determined whether the film-end-edge counter (ee_film_end_edge) is 0 (step S410). If it is determined that the film-end-edge counter (ee_film_end_edge) is not 0, indicating that the counting the leading and trailing edges of the film pulses generated at the end of the film 14 (i.e., end portion of less than one film frame) has not yet completed, the film-end-edge counter (ee_film_end_edge) is decreased by 1 (step S412), and control returns. If it is determined at step S410 that the film-end-edge counter (ee_film_end_edge) is 0, an edge counter (edge_counter) for counting the leading and trailing edges of the film pulses in the direction of rewinding the film 14 is increased by 1 (step S411). Subsequently, it is determined whether the edge counter (edge_counter) is 16 (step S413). If the edge counter (edge_counter) is not 16, control returns. If the edge counter (edge_counter) is 16, indicating that eight sprocket holes for one film frame has passed, the edge counter (edge counter) is set to 0 to start counting the leading and trailing edges of the film pulses generated by the sprocket holes of the subsequent film frame. Subsequently, the film-frame-number counter (ee_film_counter) is decreased by 1 (step S415), and control returns.

If it is detected at step S404 that the level of the current film pulse is not high, it is determined whether the level of the previous film pulse is high (step S407). If the level of the previous film pulse is not high, indicating that the level of the film pulse remains low, the control returns. If the level of the previous film pulse is high, indicating that the trailing edge of film pulse has been detected, the pulse-width measuring counter (edge_width_time) at this moment is stored as a high-pulse width or high-pulse duration (high_edge_width_time) (step S408) and subsequently control proceeds to step S409.

Figure 11:
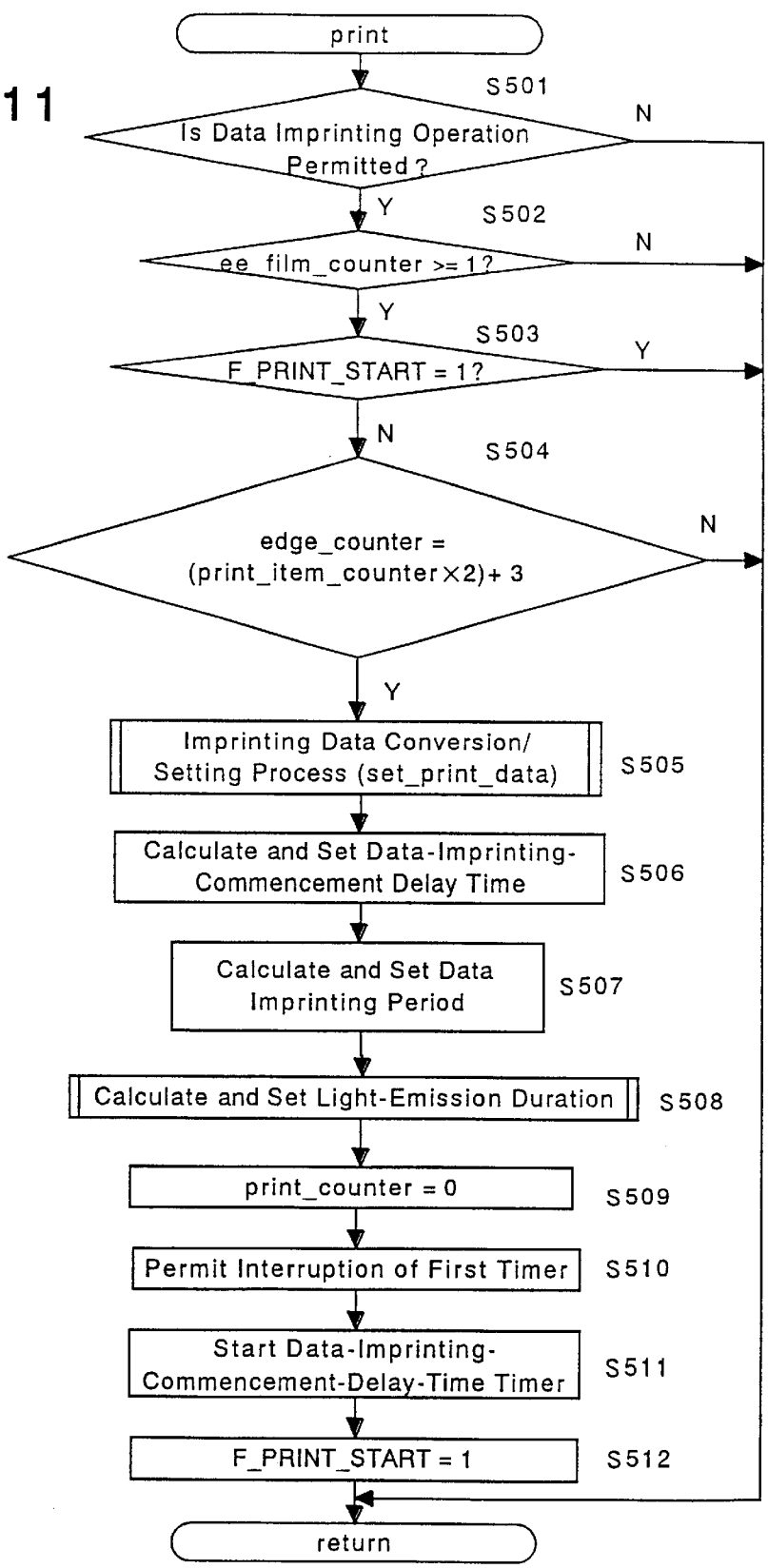
FIG. 11 is a flow chart of the data imprinting process shown in FIG. 9.

The data imprinting process performed at step S305 will be hereinafter discussed with reference to FIGS. 11, 16A and 17. FIG. 11 shows a flow chart of the data imprinting process. In the data imprinting process, firstly it is determined whether the data imprinting operation, in which photographic data is imprinted on the film 14, is permitted by checking the ON/OFF state of the data-imprinting permission switch 54 (step S501). If it is determined that the data imprinting operation is not permitted, it is not necessary to imprint any data on the film 14, and control returns. If it is determined that the data imprinting operation is permitted, it is determined whether the film-frame-number counter (ee_film_counter) is 1 or more (step S502). If the film-frame-number counter (ee_film_counter) is less than 1, control returns. If the film-frame-number counter (ee_film_counter) is 1 or more, it is determined whether the data-imprinting-start flag (F_PRINT_START) is 1, i.e., whether the data imprinting operation is now in operation (step S503).

If it is determined at step S503 that the data-imprinting-start flag (F_PRINT_START) is 1 (i.e., photographic data is currently being imprinted), control returns. If it is determined that the data-imprinting-start flag (F_PRINT_START) is not 1, it is determined whether the following equation (1) is satisfied (S504):

$$edge\_counter=(print\_item\_counter \times 2)+3 \qquad (1)$$

wherein "print_item_counter" represents the number which indicates the order of the imprinting data item for each film frame. For instance, in FIG. 16A, if AV (Aperture Value) data is imprinted on the film 14 between the fifth sprocket hole and the sixth sprocket hole, "edge_counter" is nine since "print_item_counter" is three. Namely, AV data is imprinted on the film 14 between the fifth sprocket hole and the sixth sprocket hole after nine edges of the film pulses are counted. If it is determined at step S504 that the edge counter (edge counter) does not satisfy the aforementioned equation (1), control returns. If the edge counter (edge_counter) satisfies the aforementioned equation (1), the imprinting data conversion/setting process is performed (step S505). In the imprinting data conversion /setting process, the photographic data stored in the EEPROM 51 at step S202 is converted into actual data which is to be imprinted on the film 14. This converted data is prepared for being imprinted on the film 14 in the operation at step S604 (see FIG. 12). The details of the imprinting data conversion/setting process will be discussed hereinafter.

After the imprinting data conversion/setting process, a data-imprinting-commencement delay time and a data imprinting period (the cycle "F" as shown in FIG. 17) are determined by calculation (steps S506 and S507). The data-imprinting-commencement delay time is determined at step S506 using the following equation (2):

Data-imprinting-commencement delay time=Reference delay time×(measured high-pulse duration/reference high-pulse duration)   (2)

Reference delay time corresponds to the sum of the first and second delay times "C" and "D" shown in FIG. 16A, and hence is adjusted in order to derive the data-imprinting-commencement delay time, so that photographic data starts to be imprinted from a predetermined position at a predetermined reference film speed. Reference high-pulse duration corresponds to the high pulse width (high_edge_width_time) at the predetermined reference film speed. Measured high-pulse duration corresponds to the high-pulse width (high_edge_width_time) at step S408. The first and second delay times, which constitute the Reference Delay Time, and reference high-pulse duration are predetermined and are stored in the EEPROM 51.

The data imprinting period is determined at step S507 using the following equation (3):

data imprinting period=Reference Period×(measured high-pulse duration/reference high-pulse duration)   (3).

Reference Period is determined so as to keep the width of each imprinted character pattern exposed on film constant at the predetermined reference film speed. Measured high-pulse duration corresponds to the high-pulse width (high_edge_width_time) at step S408. Reference Period and reference high-pulse duration are predetermined to be stored in the EEPROM 51.

The position of commencement of imprinting character patterns on the film 14 between two adjacent sprocket holes thereof and also the width of each imprinting character can be easily adjusted by changing Reference Delay Time and Reference Period which are stored in the EEPROM 51.

After the operation at step S507, the data imprinting time ("G" shown in FIG. 17) of the character generator 11 for each column of a matrix of seven dots by five dots is determined (step S508). Subsequently, a data-imprinting-dot counter (print_counter) is set to 0 (step S509). The data-imprinting-dot counter represents the number of columns ($0^{th}$ through $22^{nd}$ as shown in FIG. 17) of characters imprinted on the film 14 between two adjacent sprocket holes thereof. Subsequently, interruption of a data imprinting period timer (i.e. first timer) is permitted (step S510). The first timer makes an interruption every "F" period passes, as described later. A data-imprinting-commencement-delay-time timer which delays the commencement of data-imprinting between two adjacent sprocket holes by the data-imprinting-commencement delay time determined in the operation at step S506 starts (step S511), and the data-imprinting-start flag (F_PRINT_START) is set to 1 (step S512). Subsequently, control returns.

Figure 15A:
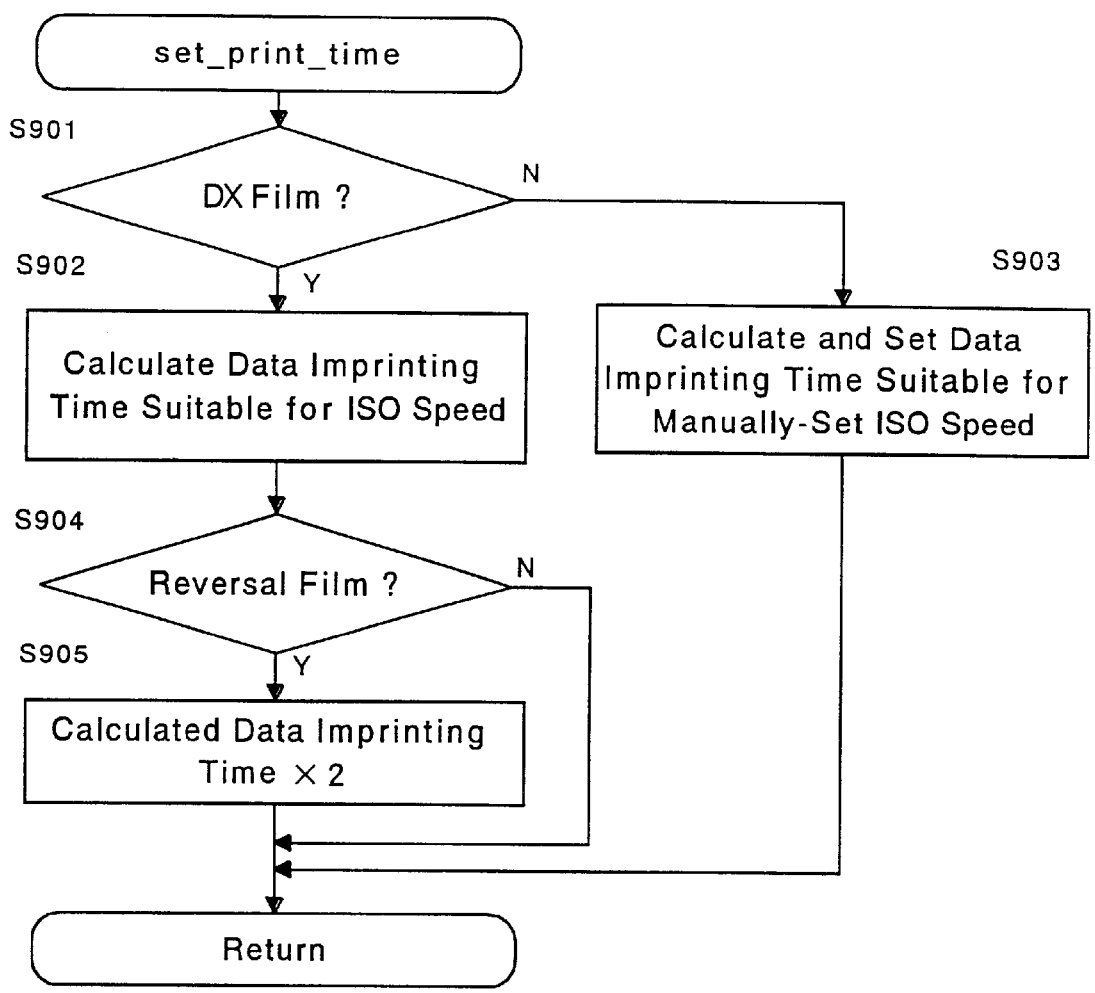
FIG. 15A is a flow chart of the data-imprinting-time setting process shown in FIG. 11.

The data-imprinting-time setting process at step S508 will be hereinafter discussed with reference to FIG. 15A. In this process, the data imprinting time (light-emission duration "G" shown in FIG. 17) is determined in accordance with ISO speed information of the film 14 loaded in the camera, and it is detected whether the film 14 is a reversal film or not from latitude information to change the light-emission duration if the film 14 is a reversal film. In the light-emission duration setting process, firstly it is determined via the DX-information pins 26 whether the film cartridge FC bears a DX code (step S901). The CPU 34 regards the film cartridge FC as a film cartridge bearing a DX code unless all the surface portions on the film cartridge which respectively correspond to the conductive and non-conductive squares of a DX code are non-conductive. If it is determined at step S901 that the film cartridge FC bears a DX code, the data imprinting time suitable for the ISO speed detected via the DX-information pins 26 is calculated using the following equation (1) (step S902):

Equation (1)

$$(\text{Data Imprinting Time}) = 25 \times 2^{\frac{50\ Hex.-SvD}{16}} (\mu S)$$

wherein "SvD" represents the value corresponding to the ISO speed SV that is determined by converting the value thereof for ease of calculation. "Hex." indicates a hexadecimal number. Table 2 below shows an example of the relation between ISO speed and the data imprinting time ($\mu$S).

TABLE 2

| ISO ($\mu$S) | SvD (Hex.) | Data Imprinting Time |
|---|---|---|
| 25 | 10 | 400 |
| 32 | 13 | 351 |
| 40 | 15 | 322 |
| 50 | 18 | 283 |
| 64 | 1B | 248 |
| 80 | 1D | 228 |
| 100 | 20 | 200 |
| 125 | 23 | 176 |
| 160 | 25 | 161 |
| 200 | 28 | 141 |
| 250 | 2B | 124 |
| 320 | 2D | 114 |
| 400 | 30 | 100 |
| 500 | 33 | 88 |
| 640 | 35 | 81 |
| 800 | 38 | 71 |
| 1000 | 3B | 62 |
| 1250 | 3D | 57 |
| 1600 | 40 | 50 |
| 2000 | 43 | 44 |
| 2500 | 45 | 40 |
| 3200 | 48 | 35 |
| 4000 | 4B | 31 |
| 5000 | 4D | 28 |

After the operation at step S902, it is determined whether the film 14 is a reversal film (step S904). If the 14 is a reversal film, the data imprinting time is set double the value of the data imprinting time determined he operation at step S902 (step S905). subsequently, control returns. The operation at step S905 is performed to the fact that reversal film is less sensitive than medium film and generally has a film base of a low transmittance, so that it is necessary for the character generator 11 to emit a large quantity of light to imprint characters of photographic data having an appropriate density, especially when the photographic data is imprinted film from the side of the film base surface, i.e., not the sensitive surface side. Whether the film 14 is a reversal film can be determined from the latitude information which is represented by the pattern of two detection squares 81 and 82 on the film cassette FC. The latitude of reversal film is generally narrow, so that the film 14 is regarded as reversal film if the latitude of the film 14 is ±1/2. If it is detected at step S904 that the film 14 is not reversal film, indicating that the film 14 is negative film, control skips step S905 because it is not necessary to adjust the data imprinting time determined at step S902. Subsequently control returns.

If it is determined at step S901 that the film cartridge FC does not bear a DX code, the data imprinting time suitable for the ISO speed manually set by the user is calculated using the aforementioned equation (4) (step S903). Thereafter, control returns.

Figure 15B:
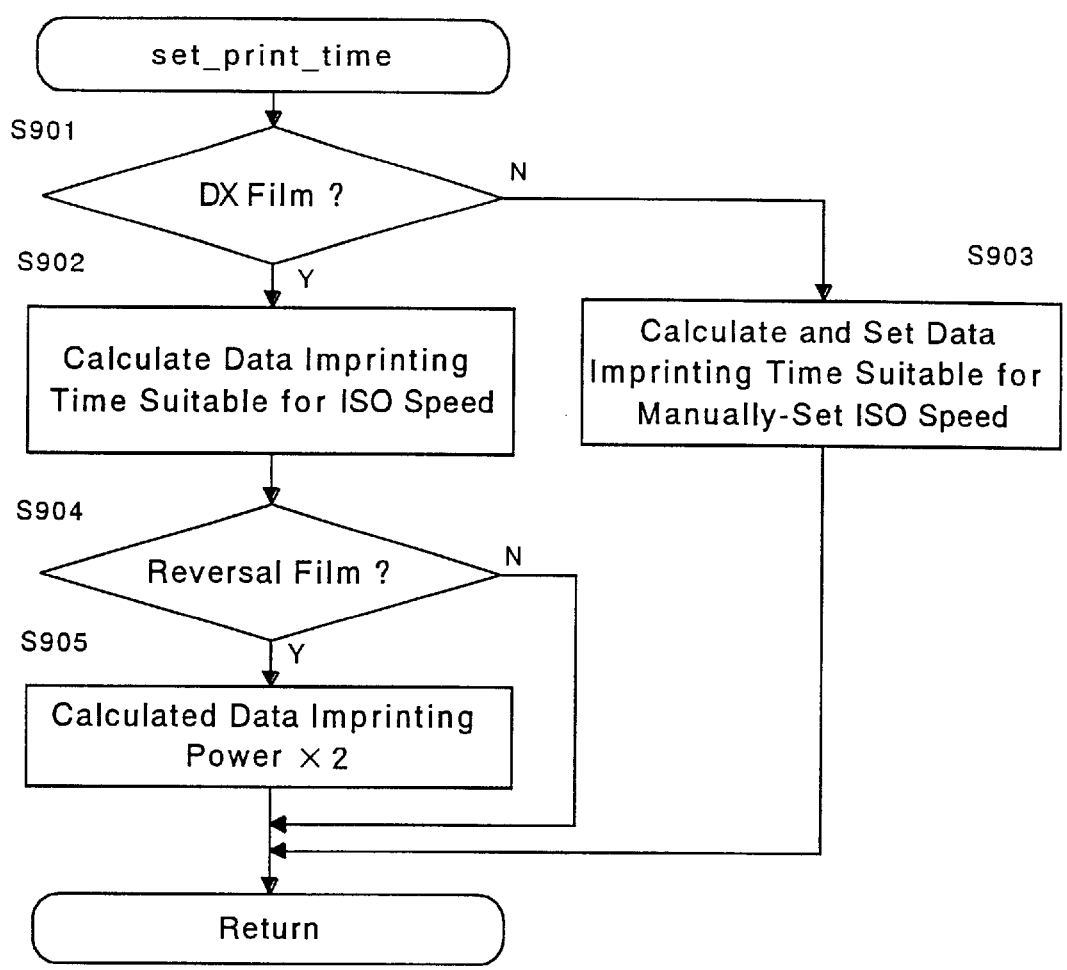
FIG. 15B is a flow chart of another embodiment of the data-imprinting-time setting process shown in FIG. 11

For instance, in the case of negative film of ISO 100, the data imprinting time is set to 200 $\mu$S in the operation at step S902 using the aforementioned equation (4). In the case of reversal film of ISO 100, in the operation at step S905 the data imprinting time is set to 400 $\mu$S, which is double the data imprinting time determined using the aforementioned equation (4). The data imprinting power remains the same unless the film is reversal film, in which case the control proceeds to step S905-2 (shown in FIG. 15B) wherein the data imprinting power is doubled.

Note that the data imprinting time is controlled by utilizing the light-emission duration "G", shown in FIG. 17.

Figure 12:
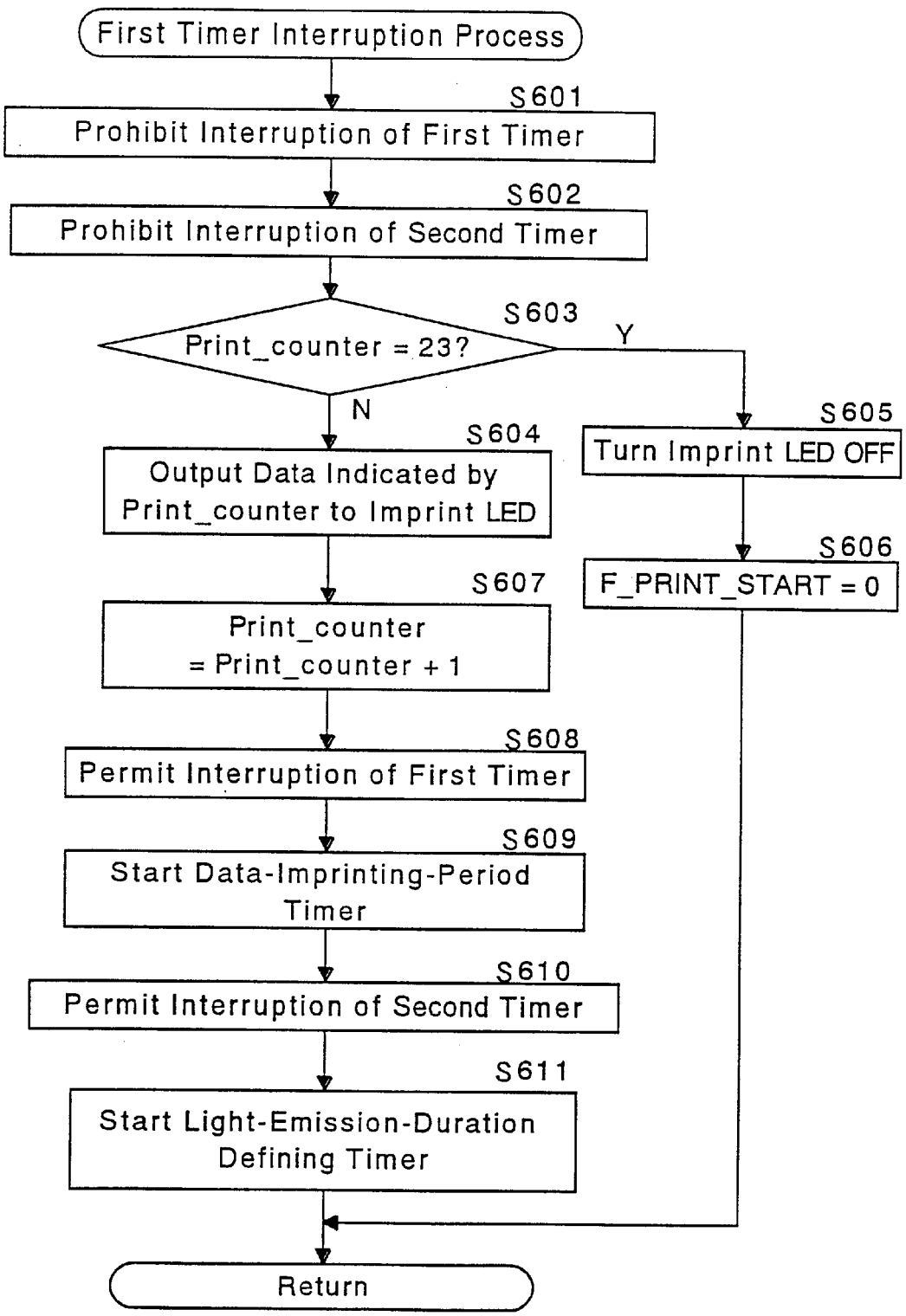
FIG. 12 is a flow chart of the first-timer interruption process.

The first-timer interruption process will be hereinafter discussed with reference to FIG. 12 which shows a flow chart thereof. This subroutine is interruption routine which allows the character generator 11 emit light to imprint data after interruption of the first timer is permitted at step S510 shown in FIG. 11. In the first-timer interruption process, firstly, interruption of the first timer is prohibited (step S601) and interruption of a light emission duration defining timer (i.e. second timer) is also prohibited (step S602). The second timer makes interruption every "G" period passed, as described later. Subsequently, it is determined whether the data-imprinting-dot counter (print_counter) is 23 (step S603). In the present embodiment, a maximum of four characters can be imprinted in each area between two adjacent sprocket holes on the film 14 (see FIG. 17) while each character is formed by a matrix of seven dots by five dots, namely, five columns each consisting of seven dots. Between two adjacent characters there is a space corresponding to one column, so that the width of four characters imprinted in the area between two adjacent sprocket holes corresponds to twenty three columns or dots. Accordingly, for each photographic data imprinted on the film 14 between two adjacent sprocket holes thereof, all twenty three columns are checked one by one.

If it is determined at step S603 that the data-imprinting-dot counter (print_counter) is 23, indicating that the data-imprinting operation for an area between two adjacent sprocket holes is completed, the character generator 11 is turned OFF (step S605), and subsequently the data-imprinting-start flag (F_PRINT_START) is set to 0 (step S606) and control returns. If it is determined at step S603 that the data-imprinting-dot counter (print_counter) is not 23, the character generator 11 is actuated to emit light in accordance with that corresponding data of the converted data obtained in the operation at step S505 which corresponds to the number indicated by the data-imprinting-dot counter (print_counter) (step S604).

Subsequently, the data-imprinting-dot counter (print_counter) is increased by one (step S607), and interruption of the first timer is permitted (step S608). Subsequently, a timer (data-imprinting-period timer) for defining the data imprinting period ("F" shown in FIG. 17) determined in the operation at step S507 starts (step S609), and interruption of the second timer is permitted (step S610). Subsequently, the timer for defining the light-emission duration ("G" shown in FIG. 17) starts (step S611), and control returns.

Figure 13:
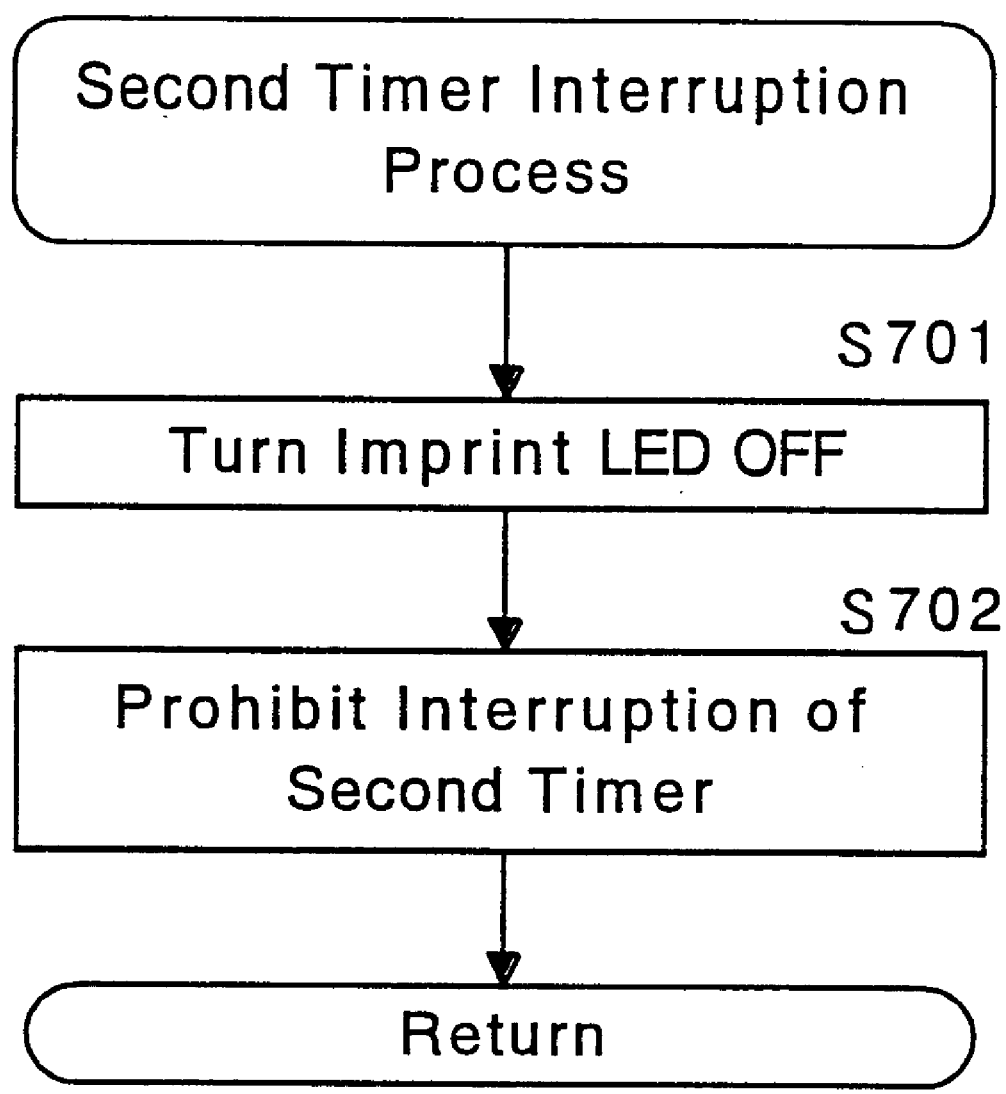
FIG. 13 is a flow chart of the second-timer interruption process.

The second-timer interruption process will be hereinafter discussed with reference to FIG. 13 which shows a flow chart thereof. This subroutine is an interruption routine for causing the character generator 11 to stop emitting light after the character generator 11 starts emitting light in the subroutine of the first-timer interruption process. In the second-timer interruption process, firstly the character generator 11 is turned OFF (step S701) and subsequently interruption of the second timer is prohibited (step S702). Thereafter control returns.

Figure 14:
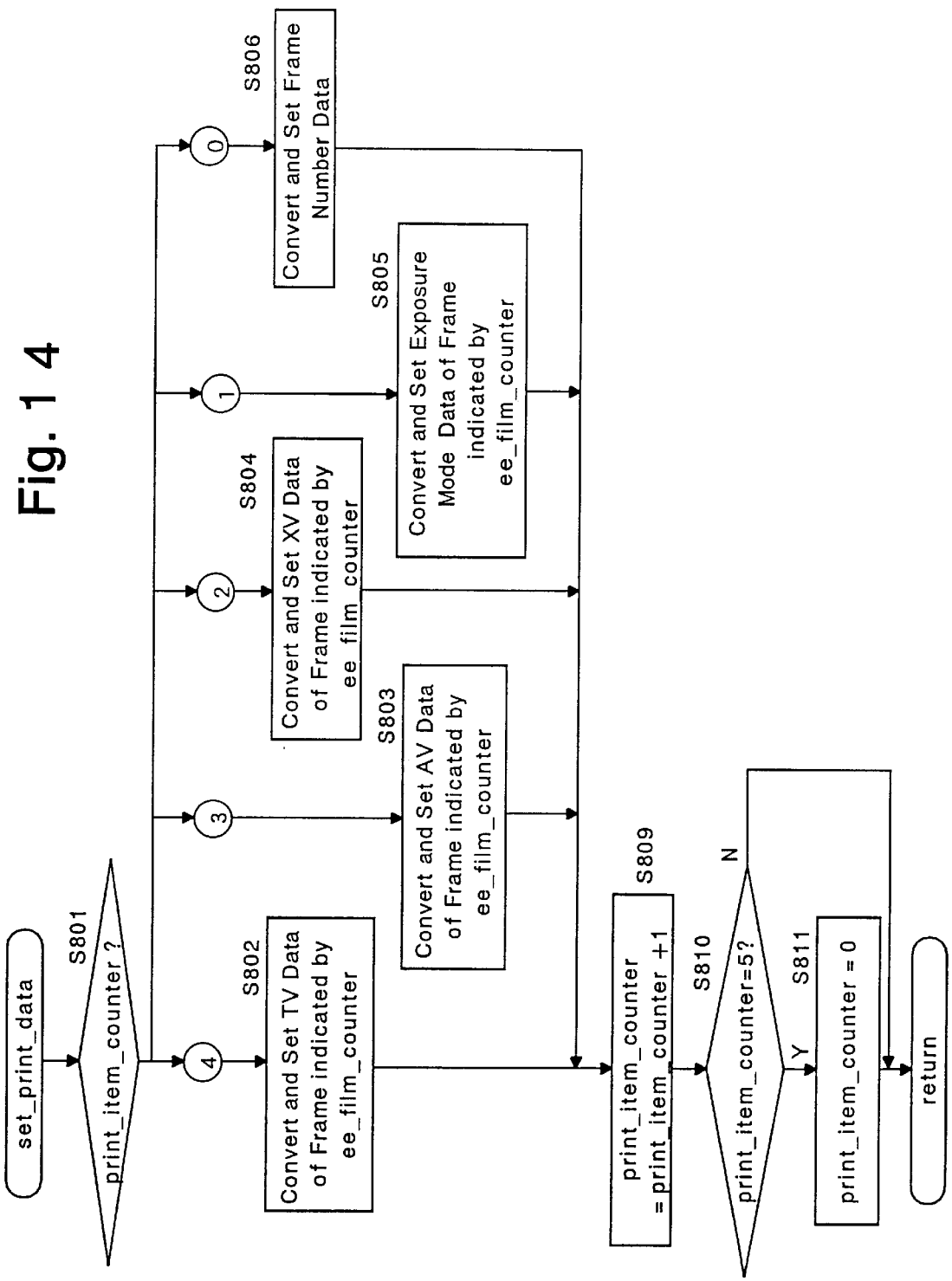
FIG. 14 is a flow chart of the imprinting data conversion/setting process shown in FIG. 11.

The imprinting data conversion/setting process at step S505 will be hereinafter discussed with reference to FIG. 14 which shows a flow chart thereof. In this process, firstly the data-item counter (print_item_counter) is checked (step S801). If the data-item counter is 4, TV (Time Value) data of the film frame indicated by the film-frame-number counter (ee_film_counter) in the photographic data stored in the EEPROM 51 at step S202 is converted and prepared for being imprinted on the film 14 (step S802). If the data-item counter is 3, similar to the case where the data-item counter is 4, AV (Aperture Value) data of the film frame indicated by the film-frame-number counter (ee_film_counter) in the photographic data stored in the EEPROM 51 at step S202 is converted and prepared for being imprinted on the film 14 (step S803). Likewise, if the data-item counter is 2, XV (Exposure Compensation Value) data of the film frame indicated by the film-frame-number counter (ee_film_counter) in the photographic data stored in the EEPROM 51 at step S202 is converted and prepared for being imprinted on the film 14 (step S804). Likewise, if the data-item counter is 1, Exposure Mode data of the film frame indicated by the film-frame-number counter (ee_film_counter) in the photographic data stored in the EEPROM 51 at step S202 is converted and prepared for being imprinted on the film 14 (step S805). Likewise, if the data-item counter is 0, Frame Number data of the film frame indicated by the film-frame-number counter (ee_film_counter) in the photographic data stored in the EEPROM 51 at step S202 is converted and prepared for being imprinted on the film 14 (step S806).

After the data converting operation at any one of steps S802 through S806, the data-item counter (print_item_counter) is increased by one in order to perform the imprinting data conversion/setting process for the subsequent data item (step S809). Subsequently, it is determined whether the data-item counter (print_item_counter) is 5 (step S810). If the data-item counter (print_item_counter) is not 5, indicating that there remains some photographic data which is to be imprinted the control returns. If the data-item counter (print_item_counter) is 5, indicating that there remains no more photographic data to be imprinted, the data-item counter (print_item_counter) is set to 0 (step S811). Thereafter, control returns.

In the present embodiment, although the photographic data is imprinted on film at the time of rewinding the film, the photographic data can be imprinted on film at the time of winding the film. FIG. 16B is a time chart showing a correlation between sprocket holes of film and each film pulse at the time of winding film. In FIG. 16B, similar to FIG. 16A, each reference letter "A" represents the duration of the high level of a film pulse, each reference letter "B" represents the duration of the low level, each reference letter "C" represents the first delay time necessary for converting four characters which are to be imprinted between two adjacent sprocket holes of the film 14 into photographic data, each reference letter "D" represents the second delay time calculated in accordance with the speed of movement of the film 14, and each reference letter "E" represents the time necessary for photographic data to be imprinted between two adjacent sprocket holes. In the present embodiment, although the photographic data is imprinted on film between two adjacent sprocket holes, the present invention can be applied to the case where the photographic data is imprinted on film in any other area.

In the illustrated embodiment, the camera is of a type wherein a 35 mm film cassette is used. However, the present invention can be applied not only to the particular type of cassette but also to any other film cassette which bears DX code or similar code such as an Advanced Photo System IX240 film cassette.

As can be understood from the above description, since the camera is provided with a controller (i.e., the CPU 34) for determining a quantity of light emitted by the light emitter (LED character generator 11) in accordance with the sensitivity detected by the film sensitivity detector, and for increasing the determined quantity of light if the film-type identifying device determines that the film is a reversal film, characters of photographic data having an appropriate density can be imprinted on film in accordance with ISO speed information of the film loaded in the camera even if photographic data is imprinted on low-sensitivity reversal film from the side of the film base surface thereof.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera having a data imprinting function, comprising:
    a data imprinting device for imprinting data on film, said data imprinting device comprising a light emitter which emits light to the film from a film base surface side of the film in accordance with character information;
    a film-type identifying device for identifying the film by detecting the latitude of the film; and
    a controller for adjusting a quantity of light emitted by said light emitter in accordance with the latitude of the film detected by said film-type identifying device.

2. The camera according to claim 1, wherein said film-type identifying device determines whether said film is reversal film, wherein said controller increases said quantity of light if said film-type identifying device determines that said film is said reversal film.

3. A camera having a data imprinting function, comprising:
    a data imprinting device for imprinting data on film, said data imprinting device comprising a light emitter which emits light to said film from the film base surface side of said film in accordance with character information;
    a film-type identifying device for identifying the sensitivity of said film and for determining whether said film is reversal film; and
    a controller for determining a quantity of light emitted by said light emitter in accordance with said sensitivity of said film identified by said film-type identifying device, and for increasing said quantity of light if said film-type identifying device determines that said film is said reversal film.

4. The camera according to claim 3, wherein said controller controls said quantity of light emitted by said light emitter by varying the duration of a light emission of said light emitter.

5. The camera according to claim 3, wherein said controller controls said quantity of light emitted by said light emitter by varying the power of a light emission of said light emitter.

6. The camera according to claim 4, wherein said controller increases said determined quantity of light by extending said duration if said film-type identifying device determines that said film is said reversal film.

7. The camera according to claim 3, further comprising a latitude identifying device for detecting the latitude of said film;
    wherein said film-type identifying device determines whether said film is said reversal film in accordance with said latitude detected by said latitude identifying device.

8. The camera according to claim 7, wherein said film is accommodated in a film cassette comprising a DX code, and herein said latitude identifying device detects said latitude by reading latitude data from said DX code.

9. The camera according to claim 8, wherein said film-type identifying device identifies said sensitivity by reading sensitivity data from said DX code.

10. The camera according to claim 3, wherein said data, imprinted by data imprinting device, comprises at least one of Time Value, Aperture Value, Exposure Compensation Value, Exposure Mode and Frame Number.

11. The camera according to claim 3, wherein said data imprinting device imprints said data on said film between two adjacent sprocket holes thereof.

12. A camera comprising:
    a data imprinting device having a light emitter which emits light to film from the film base surface side of said film in accordance with character information;
    a film-type identifying device for determining whether said film is a reversal film; and
    a controller for controlling said light emitter to emit a first quantity of light in accordance with said film type identified by said film-type identifying device if said film-type identifying device determines that said film is a type of film other than said reversal film, and for controlling said light emitter to emit a second quantity of light in accordance with said film type identified by said film-type identifying device if said film-type identifying device determines that said film is said reversal film, said second quantity of light being greater than said first quantity of light.

13. The camera according to claim 12, wherein said controller controls a quantity of light emitted by said light emitter by varying a duration of a light emission of said light emitter.

14. The camera according to claim 1, said controller controlling said quantity of light emitted by said light emitter by varying a duration of a light emission of said light emitter.

15. The camera according to claim 1, said controller controlling said quantity of light emitted by said light emitter by varying the power of a light emission of said light emitter.

16. The camera according to claim 1, said film identifying device detecting the latitude of the film by reading latitude data from a DX code provided on a film cassette.

17. The camera according to claim 1, said data imprinted by said data printing device comprising at least one of time value, aperture value, exposure compensation value, exposure mode and frame number.

18. The camera according to claim 1, said data imprinting device imprinting said data on the film between two adjacent film sprocket holes.

19. The camera according to claim 12, said film type identifying device determining whether the film is a reversal film by detecting a latitude of the film.

20. The camera according to claim 19, said film type identifying device detecting the latitude of the film by reading latitude data from a DX code provided on a film cassette.

21. The camera according to claim 1, said film type identifying device determining whether said film is reversal film, and said controller doubling the quantity of light when said film type identifying device determines that said film is reversal film.

22. The camera according to claim 3, said controller doubling said quantity of light emitted by said light emitter in response to an identification of the film by said film type identifying device that said film is reversal film.

23. The camera according to claim 12, said controller controlling said light emitter to emit a second quantity of light substantially equal to twice the first quantity of light when said film type identifying device determines that said film is reversal film.

* * * * *